(12) United States Patent
Schwarz et al.

(10) Patent No.: US 11,108,567 B2
(45) Date of Patent: *Aug. 31, 2021

(54) COMPUTE DIGITAL SIGNATURE AUTHENTICATION VERIFY INSTRUCTION

(71) Applicant: INTERNATIONAL BUSINESS MACHINES CORPORATION, Armonk, NY (US)

(72) Inventors: Eric M. Schwarz, Gardiner, NY (US); Jonathan D. Bradbury, Poughkeepsie, NY (US); Edward T. Malley, New Rochelle, NY (US); Christian Jacobi, West Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/276,715

(22) Filed: Feb. 15, 2019

(65) Prior Publication Data
US 2020/0267000 A1 Aug. 20, 2020

(51) Int. Cl.
*H04L 9/30* (2006.01)
*H04L 9/32* (2006.01)

(52) U.S. Cl.
CPC .......... *H04L 9/3252* (2013.01); *H04L 9/3033* (2013.01); *H04L 9/3066* (2013.01); *H04L 9/3236* (2013.01)

(58) Field of Classification Search
CPC ... H04L 9/0631; H04L 9/3033; H04L 9/3247; H04L 9/3236; H04L 9/3066; H04L 9/3252
See application file for complete search history.

(56) References Cited

U.S. PATENT DOCUMENTS

| | | | |
|---|---|---|---|
| 5,214,698 | A | 5/1993 | Smith et al. |
| 6,058,187 | A | 5/2000 | Chen |
| 7,171,559 | B1 | 1/2007 | Bao et al. |
| 7,940,927 | B2 | 5/2011 | Futa et al. |
| 8,467,535 | B2 | 6/2013 | Struik |

(Continued)

FOREIGN PATENT DOCUMENTS

| | | |
|---|---|---|
| CN | 1762123 A | 4/2006 |
| CN | 106330850 A | 1/2017 |
| TW | 201828642 A | 8/2018 |
| WO | WO 1999/048243 A1 | 9/1999 |

OTHER PUBLICATIONS

ANSI X9.62-1998: Public Key Cryptography for the Financial Services Industry: the Elliptic Curve Digital Signature Algorithm (ECDSA), Sep. 30, 1998, Working Draft, pp. 1-128.

(Continued)

*Primary Examiner* — Mohammad A Siddiqi
(74) *Attorney, Agent, or Firm* — Steven Chiu, Esq.; Kevin P. Radigan, Esq.; Helsin Rothenberg Farley & Mesiti P.C.

(57) ABSTRACT

A single architected instruction to verify a signed message is executed. The executing includes determining a verify function of a plurality of verify functions supported by the instruction to be performed and obtaining input for the instruction. The input includes a message and a key. Based on the verify function to be performed and the input, a signature of the message is verified.

20 Claims, 20 Drawing Sheets

(56) References Cited

U.S. PATENT DOCUMENTS

| | | | | |
|---|---|---|---|---|
| 8,891,756 | B2* | 11/2014 | Brown | H04L 9/0643 380/28 |
| 8,918,648 | B2* | 12/2014 | Brown | H04L 9/3066 713/176 |
| 9,680,653 | B1* | 6/2017 | Bradbury | G06F 9/30007 |
| 9,800,411 | B1 | 10/2017 | Brown et al. | |
| 9,825,919 | B2 | 11/2017 | Lambert | |
| 9,866,395 | B2 | 1/2018 | Bruestle et al. | |
| 10,659,230 | B2 | 5/2020 | Lin | |
| 10,733,291 | B1 | 8/2020 | McLeod | |
| 2003/0035547 | A1 | 2/2003 | Newton | |
| 2007/0168669 | A1 | 7/2007 | Jonas | |
| 2009/0136025 | A1 | 5/2009 | Kargl et al. | |
| 2012/0096273 | A1* | 4/2012 | Campagna | H04L 9/3066 713/176 |
| 2012/0134492 | A1 | 5/2012 | Liu | |
| 2012/0311340 | A1* | 12/2012 | Naganuma | H04L 63/08 713/176 |
| 2014/0089670 | A1* | 3/2014 | Maletsky | H04L 9/3252 713/176 |
| 2015/0095648 | A1 | 4/2015 | Nix | |
| 2015/0288524 | A1 | 10/2015 | Jaffe | |
| 2015/0350171 | A1* | 12/2015 | Brumley | H04L 9/3247 713/170 |
| 2016/0344557 | A1* | 11/2016 | Chabanne | H04L 9/3066 |
| 2018/0026798 | A1 | 1/2018 | Susella et al. | |
| 2019/0007219 | A1 | 1/2019 | Ghosh et al. | |
| 2019/0028284 | A1 | 1/2019 | Rezayee | |
| 2019/0097794 | A1 | 3/2019 | Nix | |
| 2019/0116046 | A1 | 4/2019 | Hoyer | |
| 2020/0184706 | A1 | 6/2020 | Speasl et al. | |
| 2020/0228349 | A1* | 7/2020 | Basu | H04L 9/085 |
| 2020/0266999 | A1* | 8/2020 | Schwarz | H04L 9/14 |
| 2020/0267001 | A1* | 8/2020 | Schwarz | H04L 9/3252 |

OTHER PUBLICATIONS

FIPS PUB 186-4, "Digital Signature Standard (DSS)," Federal Information Processing Standards Publication 186-4, Jul. 2013, pp. 1-130.

Gautschi, Michael, et al., "SIR 10US: A Tightly Coupled Elliptic-Curve Cryptography Co-Processor for the OpenRISC," 2014 IEEE 25th International Conference on Application-specific Systems, Architectures and Processors (ASAP), pp. 25-29.

IBM, "z/Architecture—Principles of Operation," IBM Publication No. SA22-7832-11, Twelfth Edition, Sep. 2017, pp. 1-1902.

Josefsson, S., et al., "Edwards-Curve Digital Signature Algorithm (EdDSA)," Internet Research Task Force (IRTF), RFC-8032, Jan. 2017, pp. 1-60.

Liusvaara, I., CFRG Elliptic Curve Diffie-Hellman (ECDH) and Signatures in JSON Object Signing and Encryption (JOSE( RFC8037), IP.com No. IPCOM000248977D, Jan. 1, 2017, pp. 1-15 (+ cover).

Mell, Peter and Tim Grance, "The NIST Definition of Cloud Computing," National Institute of Standards and Technology, Information Technology Laboratory, Special Publication 800-145, Sep. 2011, pp. 1-7.

Nir, Y. et al., Elliptic Curve Cryptography (ECC) Cipher Suites for Transport Layer Security (TLS) Versions 1.2 and Earlier (RFC8422), IP.com No. IPCOM000254816D, Aug. 1, 2018, pp. 1-35 (+ cover).

Yalcin, T., "Compact ECDSA Engine for IoT Applications," Electronics Letter 52, No. 15, Jul. 2016, pp. 1310-1312.

Schwarz, et al., "Compute Digital Signature Authentication Sign Instruction," U.S. Appl. No. 16/276,730, filed Feb. 15, 2019, pp. 1-68.

Schwarz, et al., "Compute Digital Signature Authentication Sign with Encrypted Key Instruction," U.S. Appl. No. 16/276,697, filed Feb. 15, 2019, pp. 1-69.

List of IBM Patents or Patent Applications Treated as Related, Mar. 6, 2019, pp. 1-2.

Pessl et al., "Curved Tags—A Low-Resource ECDSA Implementation Tailored for RFID," Radio Frequency Identification: Security and Privacy Issues, 10$^{th}$ International Workshop, Jul. 23, 2014, pp. 156-172 (Abstract Only).

Hutter et al., "A Cryptographic Processor for Low-Resource Devices: Canning ECDSA and EAS Like Sardines," 12$^{th}$ European Conference on Computer Vision, Jan. 2011, pp. 144-159.

Mehibel, Nissa et al., "A New Algorithm for a Public Key Cryptosystem Using Elliptic Curve," 2017 European Conference on Electrical Engineering and Computer Science, Apr. 2017, pp. 17-22.

FIPS PUB 186-3, "Digital Signature Standard (DSS)," Federal Information Processing Standards Publication 186-3, Jun. 2009, pp. 1-131.

* cited by examiner

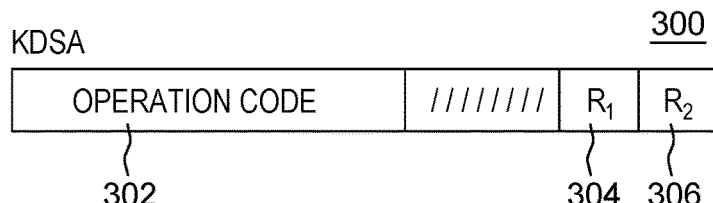

FIG. 3A

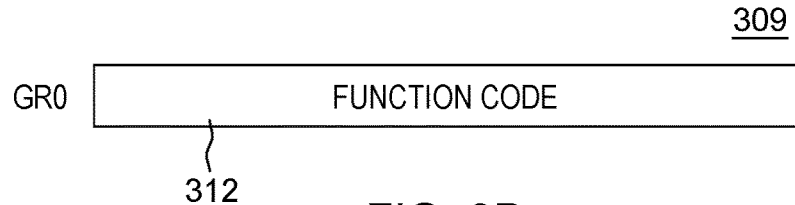

FIG. 3B

| | CODE | FUNCTION | PARAM BLOCK SIZE (BYTES) | DATA BLOCK SIZE (BYTES) |
|---|---|---|---|---|
| 313 | 0 | KDSA-QUERY | 16 | - |
| 315 | 1 | KDSA-ECDSA-Verify-P256 | 1480 | - |
| 317 | 2 | KDSA-ECDSA-Verify-P384 | 1560 | - |
| 319 | 3 | KDSA-ECDSA-Verify-P521 | 1720 | - |
| 321 | 9 | KDSA-ECDSA-Sign-P256 | 1480 | - |
| 323 | 10 | KDSA-ECDSA-Sign-P384 | 1560 | - |
| 325 | 11 | KDSA-ECDSA-Sign-P521 | 1720 | - |
| 327 | 17 | KDSA-Encrypted-ECDSA-Sign-P256 | 1544 | - |
| 329 | 18 | KDSA-Encrypted-ECDSA-Sign-P384 | 1640 | - |
| 331 | 19 | KDSA-Encrypted-ECDSA-Sign-P521 | 1832 | - |
| 333 | 32 | KDSA-EdDSA-Verify-Ed25519 | 1576 | 32 |
| 335 | 36 | KDSA-EdDSA-Verify-Ed448 | 1832 | 64 |
| 337 | 40 | KDSA-EdDSA-Sign-Ed25519 | 1768 | 32 |
| 339 | 44 | KDSA-EdDSA-Sign-Ed448 | 2216 | 64 |
| 341 | 48 | KDSA-Encrypted-EdDSA-Sign-Ed25519 | 1800 | 32 |
| 343 | 52 | KDSA-Encrypted-EdDSA-Sign-Ed448 | 2248 | 64 |

FIG. 3C

| OFFSET | | KDSA - ECDSA - VERIFY - P521 | 414 |
|---|---|---|---|
| DEC | HEX | | |
| 00 | 00 | | |
| 80 | 50 | SIGNATURE (R) | 415 |
| 160 | A0 | SIGNATURE (S) | 416 |
| 240 | F0 | HASHED MESSAGE - H(msg) | 417 |
| 400 | 190 | PUBLIC CRYPTOGRAPHIC KEY (K) | 418 |
| 1720 | 6B8 | RESERVED SAVE AREA | 419 |

FIG. 4D

| OFFSET | | KDSA - ECDSA - SIGN - P256 | 420 |
|---|---|---|---|
| DEC | HEX | | |
| 00 | 00 | | |
| 32 | 20 | SIGNATURE (R) | 421 |
| 64 | 40 | SIGNATURE (S) | 422 |
| 96 | 60 | HASHED MESSAGE - H(msg) | 423 |
| 128 | 80 | PRIVATE CRYPTOGRAPHIC KEY (K) IN PLAIN TEXT | 424 |
| 160 | A0 | RANDOM NUMBER (RN) | 425 |
| 1480 | 5C8 | RESERVED SAVE AREA | 426 |

FIG. 4E

| OFFSET | | KDSA - ECDSA - SIGN - P384 | 427 |
|---|---|---|---|
| DEC | HEX | | |
| 00 | 00 | | |
| 48 | 30 | SIGNATURE (R) | 428 |
| 96 | 60 | SIGNATURE (S) | 429 |
| 144 | 90 | HASHED MESSAGE - H(msg) | 430 |
| 192 | C0 | PRIVATE CRYPTOGRAPHIC KEY (K) IN PLAIN TEXT | 431 |
| 240 | F0 | RANDOM NUMBER (RN) | 432 |
| 1560 | 618 | RESERVED SAVE AREA | 433 |

FIG. 4F

| OFFSET | | | |
|---|---|---|---|
| DEC | HEX | KDSA - ECDSA - SIGN - P521 | 434 |
| 00 | 00 | SIGNATURE (R) | ~435 |
| 80 | 50 | SIGNATURE (S) | ~436 |
| 160 | A0 | HASHED MESSAGE - H(msg) | ~437 |
| 240 | F0 | PRIVATE CRYPTOGRAPHIC KEY (K) IN PLAIN TEXT | ~438 |
| 320 | 140 | RANDOM NUMBER (RN) | ~439 |
| 400 | 190 | RESERVED SAVE AREA | ~440 |
| 1720 | 6B8 | | |

FIG. 4G

| OFFSET | | | |
|---|---|---|---|
| DEC | HEX | KDSA - ENCRYPTED - ECDSA - SIGN - P256 | 441 |
| 00 | 00 | SIGNATURE (R) | ~442 |
| 32 | 20 | SIGNATURE (S) | ~443 |
| 64 | 40 | HASHED MESSAGE - H(msg) | ~444 |
| 96 | 60 | ENCRYPTED PRIVATE CRYPTOGRAPHIC KEY (WK$_a$(K)) | ~445 |
| 128 | 80 | RANDOM NUMBER (RN) | ~446 |
| 160 | A0 | AES WRAPPING-KEY VERIFICATION PATTERN (WK$_a$VP) | ~447 |
| 192 | C0 | RESERVED SAVE AREA | ~448 |
| 1544 | 608 | | |

FIG. 4H

| OFFSET | | | |
|---|---|---|---|
| DEC | HEX | KDSA - ENCRYPTED - ECDSA - SIGN - P384 | 449 |
| 00 | 00 | SIGNATURE (R) | ~450 |
| 48 | 30 | SIGNATURE (S) | ~451 |
| 96 | 60 | HASHED MESSAGE - H(msg) | ~452 |
| 144 | 90 | ENCRYPTED PRIVATE CRYPTOGRAPHIC KEY (WK$_a$(K)) | ~453 |
| 192 | C0 | RANDOM NUMBER (RN) | ~454 |
| 244 | F0 | AES WRAPPING-KEY VERIFICATION PATTERN (WK$_a$VP) | ~455 |
| 272 | 110 | RESERVED SAVE AREA | ~456 |
| 1640 | 668 | | |

KDSA - ENCRYPTED - ECDSA - SIGN - P521  457

| OFFSET DEC | OFFSET HEX | Field |
|---|---|---|
| 00 | 00 | SIGNATURE (R) — 458 |
| 80 | 50 | SIGNATURE (S) — 459 |
| 160 | A0 | HASHED MESSAGE - H(msg) — 460 |
| 240 | F0 | ENCRYPTED PRIVATE CRYPTOGRAPHIC KEY (WK$_a$(K)) — 461 |
| 320 | 140 | RANDOM NUMBER (RN) — 462 |
| 400 | 190 | AES WRAPPING-KEY VERIFICATION PATTERN (WK$_a$VP) — 463 |
| 432 | 1B0 | RESERVED SAVE AREA — 464 |
| 1832 | 728 | |

FIG. 4K

KDSA - EdDSA - VERIFY - Ed25519  468

| OFFSET DEC | OFFSET HEX | Field |
|---|---|---|
| 00 | 00 | SIGNATURE (R) — 469 |
| 32 | 20 | SIGNATURE (S) — 470 |
| 64 | 40 | PUBLIC CRYPTOGRAPHIC KEY (K) — 471 |
| 96 | 60 | RESERVED SAVE AREA — 472 |
| 1576 | 628 | |

FIG. 4L

KDSA - EdDSA - VERIFY - Ed448  473

| OFFSET DEC | OFFSET HEX | Field |
|---|---|---|
| 00 | 00 | SIGNATURE (R) — 474 |
| 64 | 40 | SIGNATURE (S) — 475 |
| 128 | 80 | PUBLIC CRYPTOGRAPHIC KEY (K) — 476 |
| 192 | C0 | RESERVED SAVE AREA — 477 |
| 1832 | 728 | |

| OFFSET | | | |
|---|---|---|---|
| DEC | HEX | KDSA - ENCRYPTED - EdDSA - SIGN - Ed25519 | 488 |
| 00 | 00 | SIGNATURE (R) | — 489 |
| 32 | 20 | SIGNATURE (S) | — 490 |
| 64 | 40 | ENCRYPTED PRIVATE CRYPTOGRAPHIC KEY ($WK_a(K)$) | — 491 |
| 96 | 60 | AES WRAPPING KEY VERIFICATION PATTERN ($WK_aVP$) | — 492 |
| 128 | 80 | RESERVED SAVE AREA | — 493 |
| 1800 | 708 | | |

FIG. 4O

| OFFSET | | | |
|---|---|---|---|
| DEC | HEX | KDSA - ENCRYPTED - EdDSA - SIGN - Ed448 | 494 |
| 00 | 00 | SIGNATURE (R) | — 495 |
| 64 | 40 | SIGNATURE (S) | — 496 |
| 128 | 80 | ENCRYPTED PRIVATE CRYPTOGRAPHIC KEY ($WK_a(K)$) | — 497 |
| 192 | C0 | AES WRAPPING KEY VERIFICATION PATTERN ($WK_aVP$) | — 498 |
| 224 | E0 | RESERVED SAVE AREA | — 499 |
| 2248 | 8C8 | | |

FIG. 4P

| FUNCTION CODE | FUNCTION | KEY LENGTH (BYTES) | KEY OFFSET (BYTES) |
|---|---|---|---|
| 1 | KDSA-ECDSA-Verify-P256 | 32x2 | 96-159 |
| 2 | KDSA-ECDSA-Verify-P384 | 48x2 | 144-239 |
| 3 | KDSA-ECDSA-Verify-P521 | 66*x2 | 254-319, 334-399 |
| 9 | KDSA-ECDSA-Sign-P256 | 32 | 96-127 |
| 10 | KDSA-ECDSA-Sign-P384 | 48 | 144-191 |
| 11 | KDSA-ECDSA-Sign-P521 | 66* | 254-319 |
| 17 | KDSA-Encrypted-ECDSA-Sign-P256 | 32 | 96-127 |
| 18 | KDSA-Encrypted-ECDSA-Sign-P384 | 48 | 144-191 |
| 19 | KDSA-Encrypted-ECDSA-Sign-P521 | 80 | 240-319 |
| 32 | KDSA-EdDSA-Verify-Ed25519 | 32 | 64-127 |
| 36 | KDSA-EdDSA-Verify-Ed448 | 57 | 135-191 |
| 40 | KDSA-EdDSA-Sign-Ed25519 | 32* | 64-95 |
| 44 | KDSA-EdDSA-Sign-Ed448 | 57 | 135-191 |
| 48 | KDSA-Encrypted-EdDSA-Sign-Ed25519 | 32* | 64-95 |
| 52 | KDSA-Encrypted-EdDSA-Sign-Ed448 | 64 | 128-191 |

FIG. 9

```
┌─────────────────────────────────────────────────────────────────────────┐
│  ┌───────────────────────────────────────────────────────────────────┐  │
│  │  OBTAINING AN INSTRUCTION TO VERIFY A SIGNED MESSAGE ～1000        │  │
│  │                                                                    │  │
│  │      THE INSTRUCTION BEING A SINGLE ARCHITECTED INSTRUCTION ～1002 │  │
│  │                                                                    │  │
│  │  EXECUTING THE INSTRUCTION, THE EXECUTING INCLUDING ～1004         │  │
│  │                                                                    │  │
│  │      DETERMINING A VERIFY FUNCTION OF A PLURALITY OF VERIFY        │  │
│  │      FUNCTIONS SUPPORTED BY THE INSTRUCTION TO BE PERFORMED ～1006 │  │
│  │                                                                    │  │
│  │      OBTAINING INPUT FOR THE INSTRUCTION, THE INPUT INCLUDING A    │  │
│  │      MESSAGE AND A KEY ～1008                                      │  │
│  │                                                                    │  │
│  │      VERIFYING A SIGNATURE OF THE MESSAGE BASED ON THE VERIFY TO BE│  │
│  │      PERFORMED AND THE INPUT ～1010                                │  │
│  └───────────────────────────────────────────────────────────────────┘  │
│                                                                         │
│  ┌───────────────────────────────────────────────────────────────────┐  │
│  │  THE MESSAGE IS PRE-HASHED TO A FIXED LENGTH ～1011                │  │
│  │                                                                    │  │
│  │      THE MESSAGE IS PRE-HASHED FOR A SUBSET OF THE PLURALITY OF    │  │
│  │      VERIFY FUNCTIONS AND NOT FOR ANOTHER SUBSET OF THE PLURALITY OF│ │
│  │      VERIFY FUNCTIONS ～1012                                       │  │
│  └───────────────────────────────────────────────────────────────────┘  │
│                                                                         │
│  ┌───────────────────────────────────────────────────────────────────┐  │
│  │  THE KEY INCLUDES AN ELLIPTIC CURVE PUBLIC KEY ～1013              │  │
│  │                                                                    │  │
│  │  THE ELLIPTIC CURVE PUBLIC KEY INCLUDES A POINT ON A CURVE AND A   │  │
│  │  PLURALITY OF COORDINATES WITH A PRIME FIELD ～1014                │  │
│  └───────────────────────────────────────────────────────────────────┘  │
│                                                                         │
│  ┌───────────────────────────────────────────────────────────────────┐  │
│  │  THE SIGNATURE IS REPRESENTED BY A PLURALITY OF VALUES ～1016      │  │
│  │                                                                    │  │
│  │  THE PLURALITY OF VALUES INCLUDES, e.g., A FIRST INTEGER AND A SECOND│ │
│  │  INTEGER BETWEEN ZERO AND AN ORDER OF A CURVE FOR THE VERIFY FUNCTION│ │
│  │  TO BE PERFORMED ～1018                                            │  │
│  └───────────────────────────────────────────────────────────────────┘  │
│                                                                         │
│  ┌───────────────────────────────────────────────────────────────────┐  │
│  │  THE SIGNATURE IS SIGNED USING AN EDWARDS-CURVE DIGITAL SIGNATURE  │  │
│  │  ALGORITHM SIGN FUNCTION, AND THE PLURALITY OF VALUES INCLUDES A   │  │
│  │  COMPRESSED POINT AND AN INTEGER ～1019                            │  │
│  └───────────────────────────────────────────────────────────────────┘  │
└─────────────────────────────────────────────────────────────────────────┘
```

FIG. 10A

THE VERIFYING PRODUCES A VALIDITY INDICATION IN A CONDITION CODE FOR THE INSTRUCTION ~1020

THE PLURALITY OF VERIFY FUNCTIONS INCLUDES A PLURALITY OF ELLIPTIC CURVE DIGITAL SIGNATURE ALGORITHM VERIFY FUNCTIONS FOR A PLURALITY OF PRIMES ~1022

THE PLURALITY OF PRIMES INCLUDES NATIONAL INSTITUTE OF STANDARDS AND TECHNOLOGY (NIST) PRIME P256, NIST PRIME P384 AND NIST PRIME P521 ~1024

THE PLURALITY OF VERIFY FUNCTIONS INCLUDES A PLURALITY OF EDWARDS-CURVE DIGITAL SIGNATURE ALGORITHM VERIFY FUNCTIONS FOR A PLURALITY OF PRIMES ~1026

THE PLURALITY OF PRIMES INCLUDES EDWARDS-CURVE PRIME ED25519 AND EDWARDS-CURVE PRIME ED448 ~1028

FIG. 10B

COMPUTE DIGITAL SIGNATURE AUTHENTICATION VERIFY INSTRUCTION

BACKGROUND

One or more aspects relate, in general, to facilitating processing within a computing environment, and in particular, to facilitating generation and verification of digital signatures used in authenticating messages transmitted within the computing environment.

A digital signature is used to verify the authenticity of digital messages. The sender of a message signs the message with a digital signature and the signed message is sent to a recipient. The recipient uses the digital signature to verify the sender of the message and to confirm that the message has not been modified.

To generate and/or verify a digital signature, an authentication technique is used. Example authentication techniques include the Elliptic Curve Digital Signature Algorithm (ECDSA), the Edwards-curve Digital Signature Algorithm (EdDSA), as well as others. Each authentication technique is based on mathematical constructs. For instance, the Elliptic Curve Digital Signature Algorithm and the Edwards-curve Digital Signature Algorithm use elliptic curves in generating and/or verifying a digital signature.

The algorithms are implemented in software programs, which are used to generate and/or verify digital signatures. The software programs include many primitive software instructions used to generate the digital signature, and/or many primitive software instructions to verify the digital signature.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining an instruction to verify a signed message. The instruction is a single architected instruction. The instruction is executed, and the executing includes determining a verify function of a plurality of verify functions supported by the instruction to be performed. Input for the instruction is obtained, which includes a message and a key. A signature of the message is verified based on the verify function to be performed and the input.

By using a single architected instruction, a significant subset of primitive software instructions to perform the function is replaced by the single architected instruction. The replacement of those primitive instructions with a single architected instruction reduces program complexity and eliminates the need to include code to optimize the primitive instructions. Overall performance is improved. Further, by using a single instruction, interim results are encrypted providing enhanced security.

As one example, the message is pre-hashed to a fixed length. For instance, the message is pre-hashed for a subset of functions of the plurality of verify functions and not for another subset of functions of the plurality of verify functions.

In one example, the key includes an elliptic curve public key. The elliptic curve public key includes, for instance, a point on a curve and a plurality of coordinates with a prime field.

Further, in one example, the signature is represented by a plurality of values. In one example, the plurality of values includes a first integer and a second integer between zero and an order of a curve for the verify function to be performed. Further, in one particular example, the signature is signed using an Edwards-curve digital signature algorithm sign function, and the plurality of values includes a compressed point and an integer.

In one embodiment, the verifying produces a validity indication in a condition code for the instruction. As one example, the plurality of verify functions includes a plurality of elliptic curve digital signature algorithm verify functions for a plurality of primes. The plurality of primes for this example includes, for instance, National Institute of Standards and Technology (NIST) prime P256, NIST prime P384 and NIST prime P521. In a further example, the plurality of verify functions includes a plurality of Edwards-curve digital signature algorithm verify functions for a plurality of primes. The plurality of primes for this example includes, for instance, Edwards-curve prime Ed25519 and Edwards-curve prime Ed448.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3A depicts one format of a Compute Digital Signature Authentication (KDSA) instruction, in accordance with an aspect of the present invention;

FIG. 3B depicts one example of a field of an implied register, general register 0, used by the instruction, in accordance with an aspect of the present invention;

FIG. 3C depicts one example of function codes supported by the instruction, in accordance with an aspect of the present invention;

FIG. 9 depicts example key lengths and offsets for functions of the Compute Digital Signature Authentication instruction, in accordance with an aspect of the present invention;

FIGS. 10A-10B depict one example of facilitating processing within a computing environment, in accordance with an aspect of the present invention;

DETAILED DESCRIPTION

In accordance with an aspect of the present invention, a capability is provided to facilitate processing within a computing environment. As one example, a single instruction (e.g., a single architected hardware machine instruction at the hardware/software interface) is provided to perform an operation, such as a compute digital signature authentication operation. The instruction is part of a general-purpose processor instruction set architecture (ISA), which is dispatched by a program (e.g., a user program) on a processor, such as a general-purpose processor.

In one example, the instruction, referred to as a Compute Digital Signature Authentication instruction (KDSA), is used to generate a signature for use in signing a message to be transmitted and for verifying the authenticity of the message when received. The instruction is, for instance, part of a message security assist extension (e.g., Message Security Assist Extension 9) facility of the z/Architecture® hardware architecture, offered by International Business Machines Corporation, Armonk, N.Y. The message security assist extension provides support for elliptical curve cryptography authentication of a message, generation of elliptical curve keys and scalar multiplication. The Compute Digital Signature Authentication instruction provides support for the signing and verification of elliptical curves. Functions provided by the instruction include, for instance: KDSA-Query, KDSA-ECDSA-Verify-P256, KDSA-ECDSA-Verify-P384, KDSA-ECDSA-Verify-P521, KDSA-ECDSA-Sign-P256, KDSA-ECDSA-Sign-P384, KDSA-ECDSA-Sign-P521, KDSA-Encrypted-ECDSA-Sign-P256, KDSA-Encrypted-ECDSA-Sign-P384, KDSA-Encrypted-ECDSA-Sign-P521, KDSA-EdDSA-Verify-Ed25519, KDSA-EdDSA-Verify-Ed448, KDSA-EdDSA-Sign-Ed25519, KDSA-EdDSA-Sign-Ed448, KDSA-Encrypted-EdDSA-Sign-Ed25519, and KDSA-Encrypted-EdDSA-Sign-Ed448. These functions, except for the query function, are used in signing and verifying messages using various techniques for different National Institute of Standards and Technology (NIST) primes.

Figure 1A:
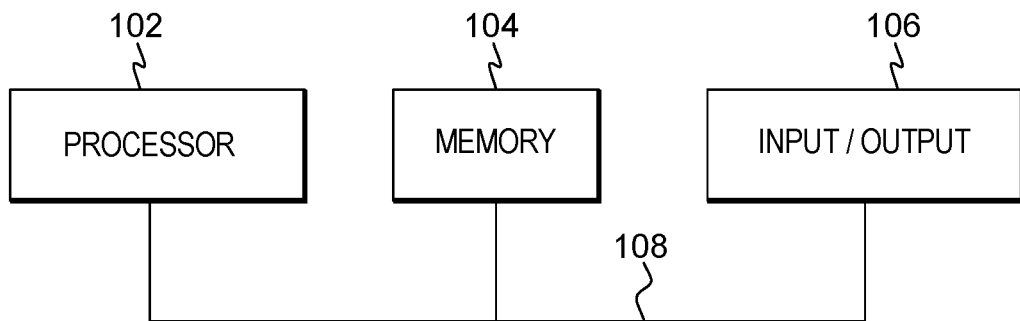
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, Armonk, N.Y., and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12th edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
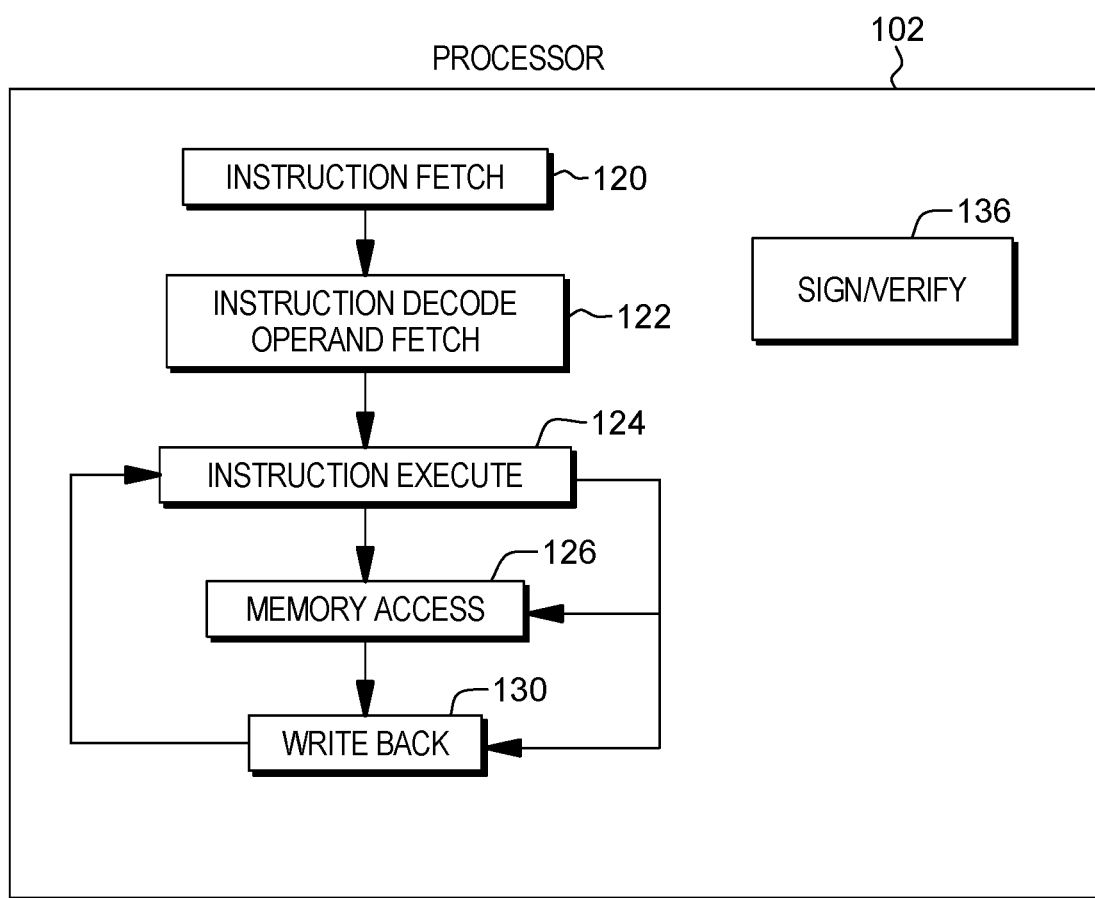
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in signing/verifying processing (or other processing that may use one or more aspects of the present invention), as described herein. The one or more other components include, for instance, a sign/verify component (or other component) 136. As examples, the signing/verifying processing includes generating a signature, transmitting a message with the signature, and/or authenticating the received message and/or the sender using the signature.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
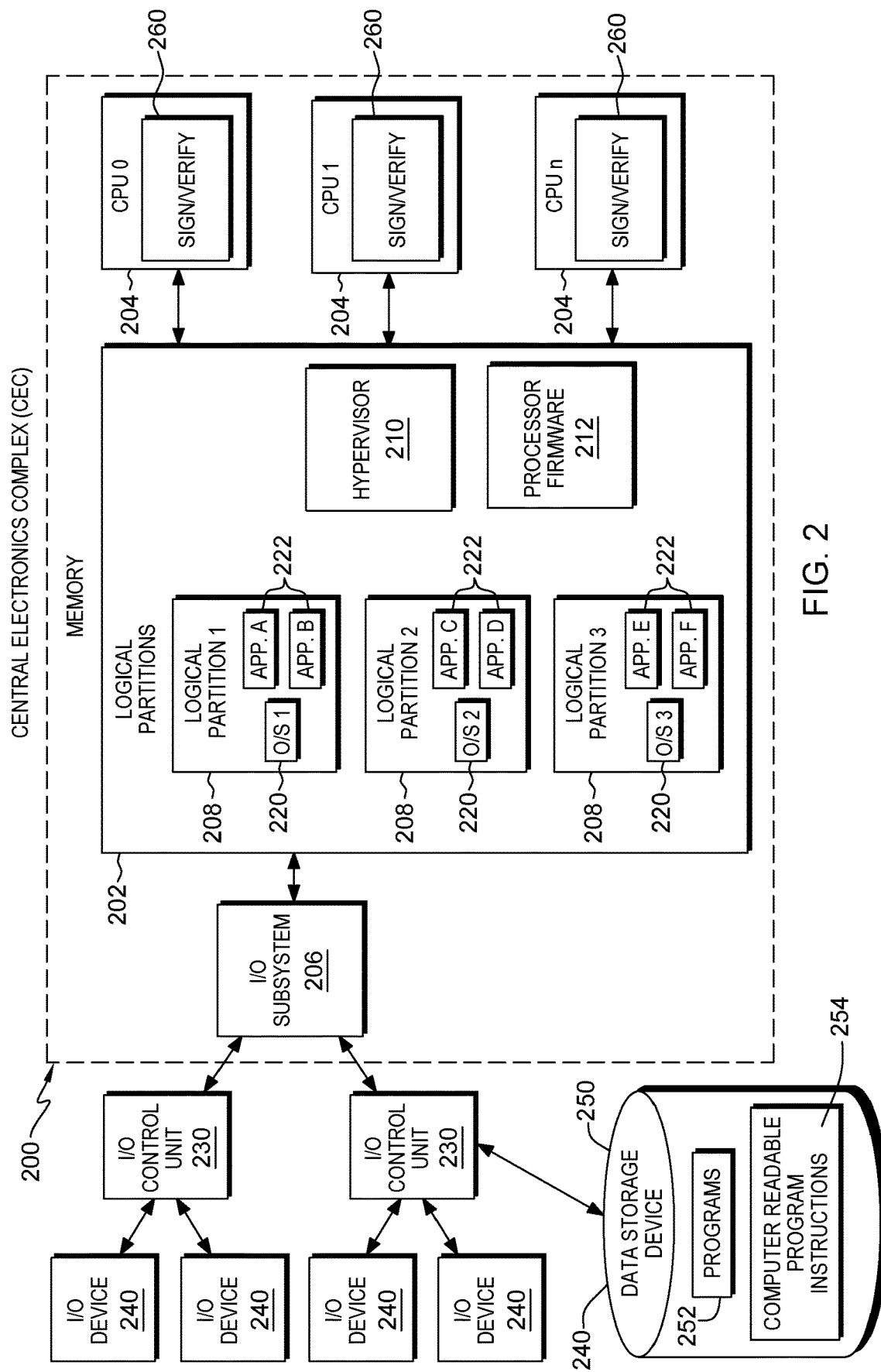
FIG. 2 depicts another example of a computing environment to incorporate and use one or more aspects of the present invention.

Referring to FIG. 2, in one example, the computing environment includes a central electronics complex (CEC)

200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM') hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

As one example, each processor 204 includes and/or has access to a sign/verify component (or other component) 260 used in performing one or more of generating a signature used to sign a message, transmitting a message using the signature and/or verification of digital signatures (and/or other operations of one or more aspects of the present invention). In various examples, there may be one or more components performing these tasks. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a computing environment, such as computing environment 100 or central electronics complex 200, employs a message security assist extension facility that provides a mechanism to generate a digital signature and/or verify a digital signature. In one example, the message security assist extension facility (e.g., a Message Security Assist Extension 9 facility) is installed in the system when a facility indicator is set, e.g., to one. As one particular example of the z/Architecture hardware architecture, facility bit 155 is set to, e.g., one, when the facility is installed in the z/Architecture architectural mode. The facility includes, for instance, the Compute Digital Signature Authentication instruction, an embodiment of which is described below.

One embodiment of the Compute Digital Signature Authentication (KDSA) instruction is described with reference to FIGS. 3A-3F. The instruction is executed, in one example, using a processor, such as a general-purpose processor (e.g., processor 102 or 204). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, is specified, this is only an example. The bit may be set to a different value, such as the opposite value or to another value, in other examples. Many variations are possible.

Referring to FIG. 3A, in one example, the format of a Compute Digital Signature Authentication (KDSA) instruction 300 is an RRE format that denotes a register and register operation with an extended operation code (opcode) field. As an example, the instruction includes an operation code field 302 (e.g., bits 0-15) having an operation code indicating a compute digital signature authentication operation; a first register field ($R_1$) 304 (e.g., bits 24-27), which is reserved, in one example, and should include zeros; and a second register field ($R_2$) 306 (e.g., bits 28-31) designating a pair of general registers. The contents of a register designated by $R_2$ field 306 specify a location of a second operand (in storage). The contents of $R_2+1$ specify the length of the second operand. In one example, bits 16-23 of the instruction are reserved and should contain zeros; otherwise, the program may not operate compatibly in the future. As used herein, the program is the one issuing the instruction. It may be a user program or another type of program.

In one embodiment, execution of the instruction includes the use of one or more implied general registers (i.e., registers not explicitly designated by the instruction). For instance, general registers 0 and 1 are used in execution of the instruction, as described herein. In one example, general register 0 contains various controls affecting the operation of the instruction, and general register 1 is used to provide a location of a parameter block used by the instruction.

As an example, with reference to FIG. 3B, a general register 0 (309) includes a function code field 312 that includes a function code. In one particular example, bit positions 57-63 of general register 0 contain the function code; in other embodiments, other bits may be used to contain the function code. Further, bits 0-31 of general register 0 are ignored, and bits 32-56 are reserved and should contain zeros; otherwise, the program may not operate compatibly in the future. When bits 57-63 of general register 0 designate an unassigned or uninstalled function code, a specification exception is recognized, in one example.

Example assigned function codes for the Compute Digital Signature Authentication (KDSA) instruction are shown in FIG. 3C and include, for instance: function code 0 (313) indicating a KDSA-Query function; function code 1 (315) indicating a KDSA-ECDSA-Verify-P256 function; function code 2 (317) indicating a KDSA-ECDSA-Verify-P384 function; function code 3 (319) indicating a KDSA-ECDSA-Verify-P521 function; function code 9 (321) indicating a KDSA-ECDSA-Sign-P256 function; function code 10 (323) indicating a KDSA-ECDSA-Sign-P384 function; function code 11 (325) indicating a KDSA-ECDSA-Sign-P521 function; function code 17 (327) indicating a KDSA-Encrypted-ECDSA-Sign-P256 function; function code 18 (329) indicating a KDSA-Encrypted-ECDSA-Sign-P384 function; function code 19 (331) indicating a KDSA-Encrypted-ECDSA-Sign-P521 function; function code 32 (333) indicating a KDSA-EdDSA-Verify-Ed25519 function; function code 36 (335) indicating a KDSA-EdDSA-Verify-Ed448 function; function code 40 (337) indicating a KDSA-EdDSA-Sign-Ed25519 function; function code 44 (339) indicating a KDSA-EdDSA-Sign-Ed448 function; function code 48 (341) indicating a KDSA-Encrypted-EdDSA-Sign-Ed25519 function; and function code 52 (343) indicating a KDSA-Encrypted-EdDSA-Sign-Ed448 function.

Each function uses a parameter block and the size of the parameter block depends, in one example, on the function. Example parameter block sizes for the functions are depicted in FIG. 3C, as well as example data block sizes, if applicable. Other function codes are unassigned in this example. Although example functions and function codes are described, other functions and/or function codes may be used.

A parameter block is specified by, for instance, general register 1. In one example, referring to FIG. 3D, the contents of general register 1 (314) specify, for instance, a logical address 316 of the leftmost byte of a parameter block in storage. For instance, in the 24-bit addressing mode, the contents of bit positions 40-63 of general register 1 constitute the address and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. In the access register mode, access register 1 specifies the address space containing the parameter block. Additional details regarding the parameter block for the various functions are described further below.

Returning to FIG. 3A, $R_2$ field 306 designates an even-odd pair of general registers and is to designate, for instance, an even-numbered register other than general register 0; otherwise, a specification exception is recognized. As shown in FIG. 3E, the contents of a general register $R_2$ (326) indicate a second operand address 328. For instance, the location of the leftmost byte of the second operand is specified by the contents of the $R_2$ general register, depending on the addressing mode. In one embodiment, in the 24-bit addressing mode, the contents of bit positions 40-63 of general register $R_2$ constitute the address of the second operand, and the contents of bit positions 0-39 are ignored; bits 40-63 of the updated address replace the corresponding bits in general register $R_2$, carries out of bit position 40 of the updated address are ignored, and the contents of bit positions 32-39 of general register $R_2$ are set to zeros. In the 31-bit addressing mode, the contents of bit positions 33-63 of general register $R_2$ constitute the address of the second operand, and the contents of bit positions 0-32 are ignored; bits 33-63 of the updated address replace the corresponding bits in general register $R_2$, carries out of bit position 33 of the updated address are ignored, and the content of bit position 32 of general register $R_2$ is set to zero. In the 64-bit addressing mode, the contents of bit positions 0-63 of general register $R_2$ constitute the address of the second operand; bits 0-63 of the updated address replace the contents of general register $R_2$ and carries out of bit position 0 are ignored.

The number of bytes in the second operand location is specified in general register $R_2+1$. As shown in FIG. 3F, the contents of general register $R_2+1$ (330) are used to determine the length 332 of the second operand. In one embodiment, in both the 24-bit and the 31-bit addressing modes, the contents of bit positions 32-63 of general register $R_2+1$ form a 32-bit unsigned binary integer which specifies the number of bytes in the second operand; and the updated value replaces the contents of bit positions 32-63 of general register $R_2+1$. In the 64-bit addressing mode, the contents of bit positions 0-63 of general register $R_2+1$ form a 64-bit unsigned binary integer which specifies the number of bytes in the second operand; and the updated value replaces the contents of general register $R_2+1$.

In the 24-bit or 31-bit addressing mode, the contents of bit positions 0-31 of general registers $R_2$ and $R_2+1$ remain unchanged. In access register mode, access register $R_2$ specifies the address space for the second operand. In one example, the Edwards-curve operands are byte-wise ordered in the little-endian format and the second operand is likewise ordered within the second operand address space.

The Compute Digital Signature Authentication instruction supports a plurality of authentication techniques including, for instance, the Elliptic Curve Digital Signature Algorithm (ECDSA) and the Edwards-curve Digital Signature Algorithm (EdDSA). Further, three National Institute of Standards and Technology (NIST) prime fields are supported for Weierstrass curves: e.g., P256, P384 and P521, which use the ECDSA algorithm. ECDSA refers to curve parameter values, including, for instance, a prime modulus, an order, a coefficient, a base point x, and a base point y, which are used by the appropriate function codes, and provided in a standard for the curve (e.g., FIPS PUB 186-4, Federal Information Processing Standards Publication, Digital Signature Standard (DSS), issued July 2013).

Yet further, two prime fields are supported, which use the EdDSA algorithm, referred to as, e.g., Ed25519 and Ed448. Similarly, the function codes using EdDSA also use the curve parameter values, provided in a standard for the curve (e.g., Edwards-Curve Digital Signature Algorithm (EdDSA), Internet Research Task Force (IRTF), RFC-8032, January 2017).

The following are definitions of the moduli of these fields:

$$P256=2^{256}-2^{224}+2^{192}+2^{96}-1$$

$$P384=2^{384}-2^{128}-2^{96}+2^{32}-1$$

$$P521=2^{521}-1$$

$$Ed25519=2^{255}-19$$

$$Ed448=2^{448}-2^{224}-1$$

The primes selected are recommended by various standards and provide better performance over other primes, such as random primes.

The sign and verify function codes (e.g., 1, 2, 3, 9, 10, 11, 17, 18 and 19), which use the ECDSA algorithm on NIST primes, ignore the contents of general registers $R_2$ and $R_2+1$. These functions utilize, in one example, a hashed message of fixed size which is contained in the parameter block.

The Edwards-curve functions: KDSA-EdDSA-Verify, KDSA-EdDSA-Sign, and KDSA-Encrypted-EdDSA-Sign (e.g., function codes 32, 36, 40, 44, 48 and 52), use the EdDSA algorithm, and the encrypted message is not pre-hashed, in one example. Operand 2 is the encrypted message and is addressed using the general register $R_2$ and its length is given by $R_2+1$. The PureEdDSA variant is supported for the curves Ed25519 and Ed448. Other and/or different curves may be supported in other embodiments.

In execution of the Compute Digital Signature Authentication instruction, a function specified by the function code in general register 0 is performed. Each of the supported functions is described below:

KDSA-Query (Function Code 0)

The query function provides a mechanism indicating the availability of the other functions. The contents of general registers $R_2$ and $R_2+1$ are ignored for the query function.

Figure 4A:
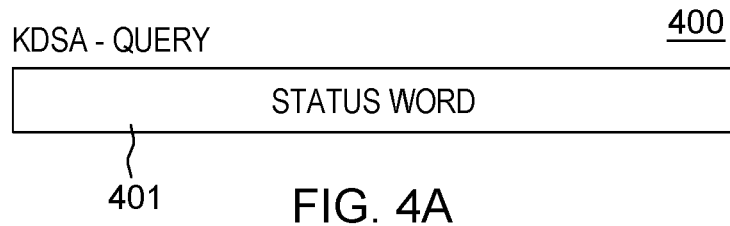
FIGS. 4A-4P depict examples of contents of parameter blocks used by various functions of the Compute Digital Signature Authentication instruction, in accordance with an aspect of the present invention.

One example of a parameter block used by the query function is described with reference to FIG. 4A. As shown, in one example, a parameter block 400 includes a 128-bit status word 401. Bits 0-127 of this field correspond to function codes 0-127, respectively, of the Compute Digital Signature Authentication instruction. When a bit is, e.g., one, the corresponding function is installed; otherwise, the function is not installed.

As an example, condition code 0 is set when execution of the KDSA-Query function completes; condition codes 1, 2 and 3 are not applicable to this function.

In addition to the query function, the Compute Digital Signature Authentication instruction supports various verify and sign functions. A verify function checks the validity of the signature of the message (e.g., hashed message) and reports whether the credentials are valid via the condition code; and a sign function creates a signature for a message (e.g., a hashed message). Various Verify and Sign functions are described below. Each function is represented by a function code that provides an indication of the curve being used. The curve has various attributes associated therewith, including, but not limited to, curve parameter values and/or other attributes, such as a generating point, an order of G, referred to as n; etc. One or more of these attributes are used in performing the function, as described below.

KDSA-ECDSA-Verify Functions

In one embodiment, three KDSA-ECDSA-Verify functions for Weierstrass curves with NIST primes are supported, and the corresponding function codes are provided below:

KDSA-ECDSA-Verify-P256 (Function Code 1)
KDSA-ECDSA-Verify-P384 (Function Code 2)
KDSA-ECDSA-Verify-P521 (Function Code 3)

Figure 3D:
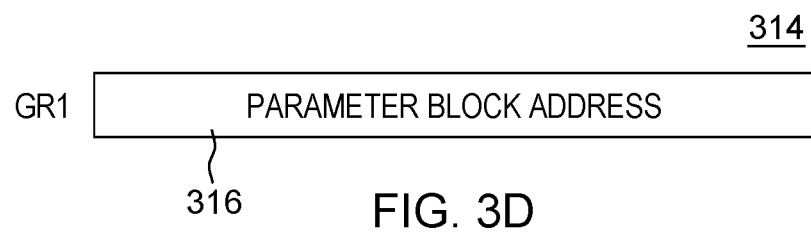
FIG. 3D depicts one example of a field of an implied register, general register 1, used by the instruction, in accordance with an aspect of the present invention.
Figure 3E:
FIG. 3E depicts one example of contents of a register, $R_2$, specified by the Compute Digital Signature Authentication instruction, in accordance with an aspect of the present invention.
Figure 3F:
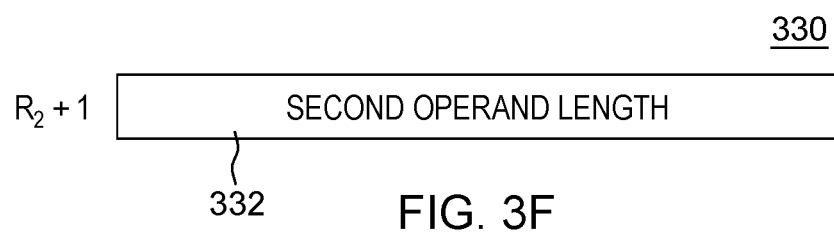
FIG. 3F depicts one example of contents of a register, $R_2+1$, used by the Compute Digital Signature Authentication instruction, in accordance with an aspect of the present invention.

The locations of the operands and addresses used by each of these functions are shown in FIGS. 3D-3F. A parameter block for each function, described below, contains the operands used by the KDSA-ECDSA-Verify functions and is addressed by general register 1.

The KDSA-ECDSA-Verify instruction checks the validity of a signed message. The originator of the message has a public key that can be used to see if the signature matches the message (e.g., hashed message). The signature includes, for instance, two integers in the prime fields designated by R and S. The originator and receiver agree on a hashing scheme for creating the signature. The KDSA-ECDSA-Verify instruction operates on the message, such as the already hashed message (e.g., pre-hashed to a fixed length), represented as H(M) in the parameter block. The originator's public key is represented by K. An elliptic curve public key is a point on the curve and has X and Y coordinates (represented by Xk and Yk) within the prime field making it twice as big as other parameters. These operands are supplied to the instruction in the parameter block. The operation results in a true or false validity indication in the condition code.

As examples, condition code 0 is set if the signature is valid, condition code 2 is set if the signature is invalid, and condition code 1 is set when the public key is invalid due to, e.g., not being greater than zero and less than the prime, and on the curve. Other examples are possible.

Figure 5:
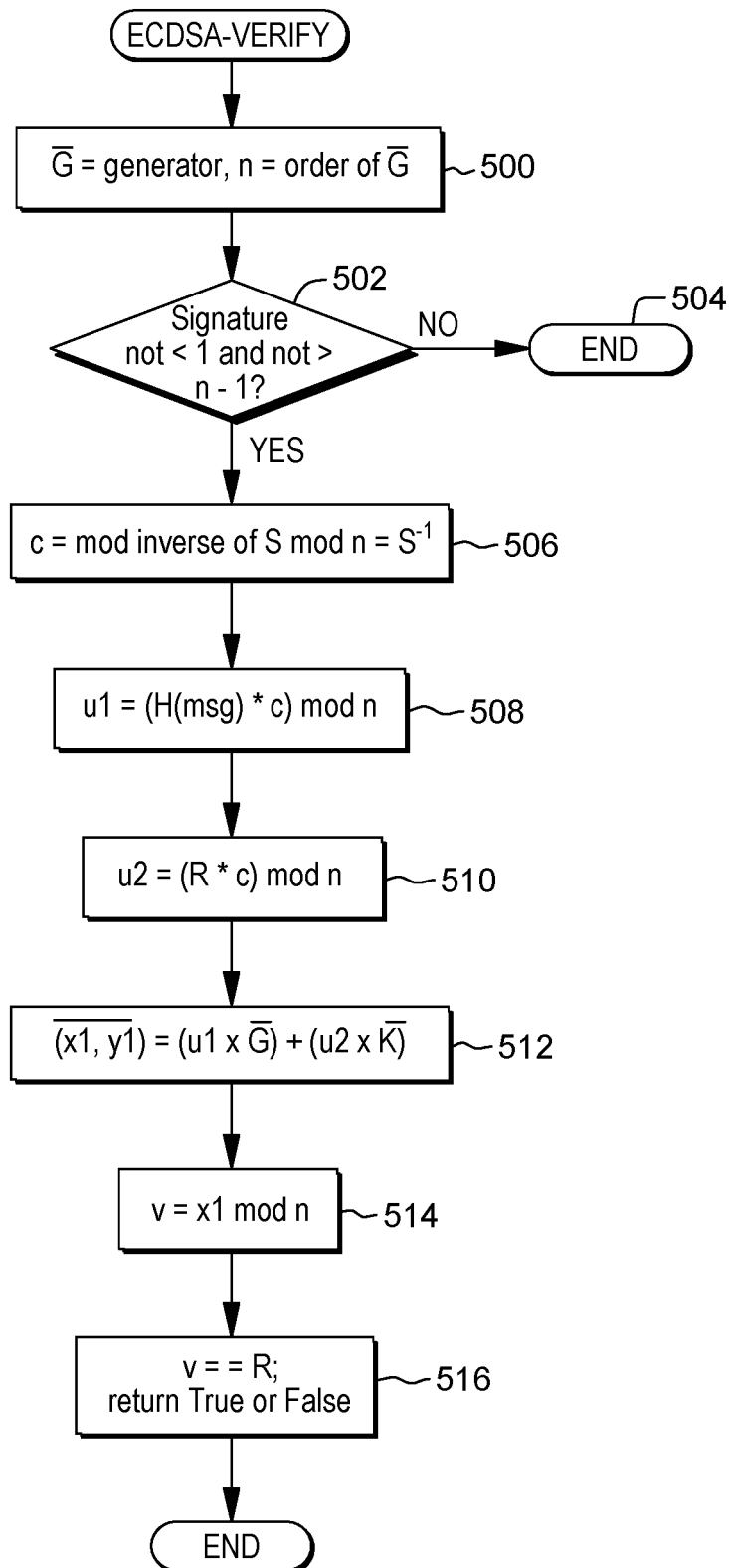
FIG. 5 depicts one example of processing associated with verifying a signature using the Elliptic Curve Digital Signature Algorithm, in accordance with an aspect of the present invention.

One example of verify processing using the Elliptic Curve Digital Signature Algorithm is described with reference to FIG. 5. In this processing, an overbar, ⁻, indicates a point with x and y coordinates versus an integer, * indicates a modular multiply, + is a modular add, x is a scalar multiplication of a point, and == is a Boolean test for an integer compare equal.

Initially, in one example, $\overline{G}$ is the generator, i.e., a distinguished point on an elliptic curve called the base point or generating point; and n is the order of $\overline{G}$, STEP 500. In one example, $\overline{G}$ and n are fixed constants per the curve (based on standards) indicated by the function code stored in memory accessible to, e.g., the hardware executing the instruction. As an example, n is to be greater than $2^{160}$. The order of a point, $\overline{P}$, is, e.g., the smallest positive integer n such that $n \times \overline{P}$ equals the point at infinity. A check is made as to whether the signature, R and S, is, e.g., not <1 and not >n−1, INQUIRY 502. If this check fails, then processing ends, STEP 504. Otherwise, c is set equal to the modular inverse of S mod n=$S^{-1}$, STEP 506. Further, u1 is set equal to (H(msg)*c) mod n, STEP 508, and u2 is set equal to (R*c) mod n, STEP 510. ($\overline{x1}$, $\overline{y1}$) is set equal to (u1×$\overline{G}$)+(u2×$\overline{K}$), STEP 512. Additionally, v is set equal to x1 mod n, STEP 514. This may also be written as v=((($\overline{G}$)$^{u1}$ ($\overline{K}$)$^{u2}$) mod p) mod n), where p is an odd prime number. A boolean test for integer compare equal is performed between v and a signature (R) and the boolean true or false is returned, e.g., in a condition code, STEP 516.

In one example, K has an x and y coordinate and is a point, which is equal to the private key d times the generator point, $\overline{G}$.

As indicated, operands for the verify functions are provided via parameter blocks, examples of which are described below. Additional details for the fields of the parameter blocks are described subsequent to describing the parameter blocks for the various functions.

Figure 4B:
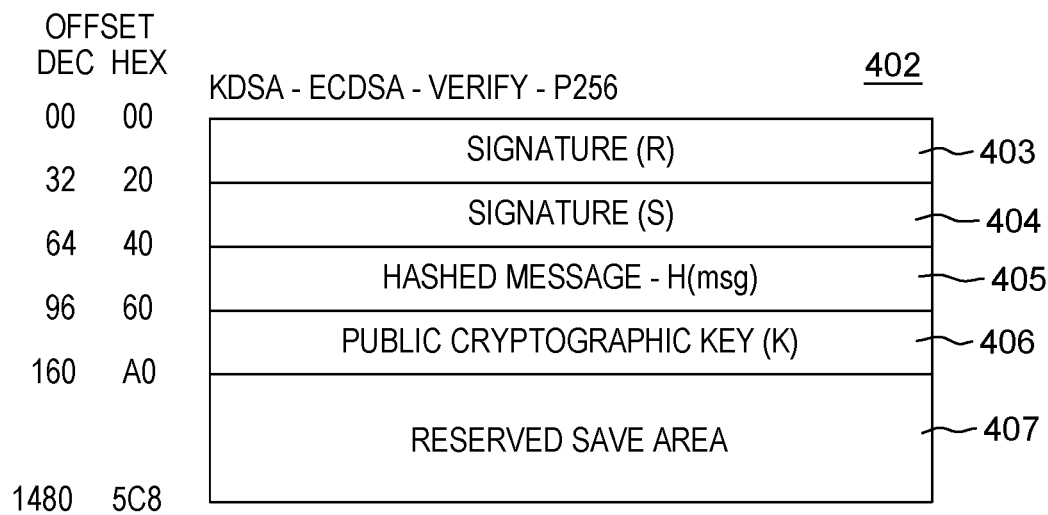

One example of a parameter block for the KDSA-ECDSA-Verify-P256 function is described with reference to FIG. 4B. In one example, a parameter block 402 includes, for instance, the following fields: a signature (R) 403, a signature (S) 404, a hashed message H(msg) 405, a public cryptographic key (K) 406 (e.g., public cryptographic key X component (Xk) and Y component (Yk)), and a reserved save area 407. In one example, each field is represented as 32 bytes or 256 bits wide, and example offsets within the parameter block are depicted in FIG. 4B. In one example, Xk is at offset Dec 96/Hex 60 and Yk is at Dec 128/Hex 80.

Figure 4C:
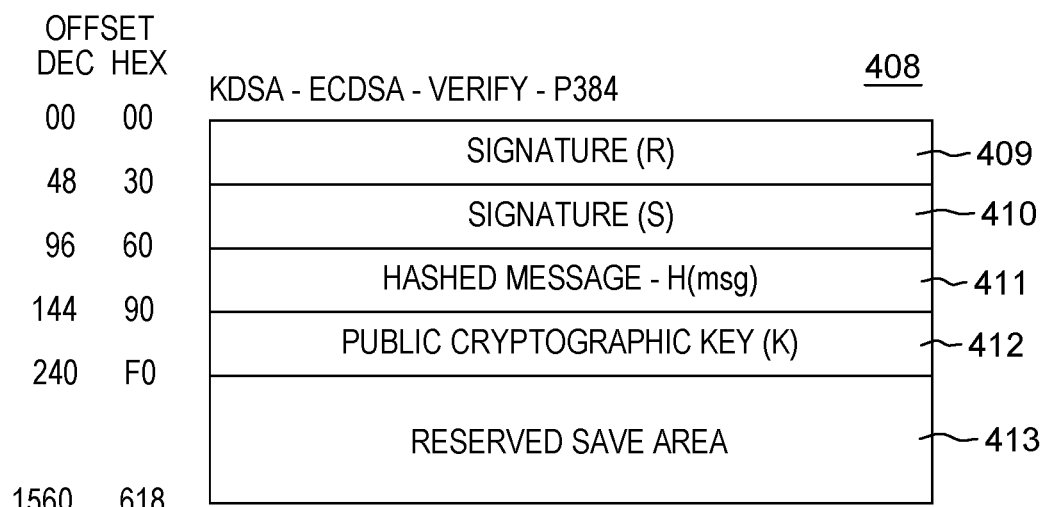

Further, one example of a parameter block for the KDSA-ECDSA-Verify-P384 function is depicted in FIG. 4C. In this example, each field is 48 bytes or 384 bits wide. As shown, a parameter block 408 includes, for instance, the following fields: a signature (R) 409, a signature (S) 410, a hashed message 411, a public cryptographic key (K) 412 (e.g., Xk and Yk), and a reserved save area 413. Example offsets within the parameter block are depicted in FIG. 4C. In one example, Xk is at Dec 144/Hex 90 and Yk is at Dec 192/Hex C0.

Yet further, as shown in FIG. 4D, a parameter block 414 for the KDSA-ECDSA-Verify-P521 function includes, e.g., the following fields: a signature (R) 415, a signature (S) 416, a hashed message 417, a public cryptographic key 418 (e.g., Xk, Yk), and a reserved save area 419. Each field is, for instance 80 bytes or 640 bits wide. In one example, the NIST standard defines data to be passed in octets which are 8 bits wide. Thus, 521 bit operands are padded on the leftmost significant bits with 7 zeros to form 528 bits or 66 bytes (octets). Each parameter includes the rightmost 66 bytes of the 80 byte field if updated. Example offsets within the parameter block are depicted in FIG. 4D. As an example, Xk is at Dec 240/Hex F0 and Yk is at Dec 320/Hex 140.

KDSA-ECDSA-Sign Functions

In one embodiment, three KDSA-ECDSA-Sign functions and three KDSA-Encrypted-ECDSA-Sign functions are supported, and the corresponding function codes are provided below:

KDSA-ECDSA-Sign-P256 (Function Code 9)
KDSA-ECDSA-Sign-P384 (Function Code 10)
KDSA-ECDSA-Sign-P521 (Function Code 11)
KDSA-Encrypted-ECDSA-Sign-P256 (Function Code 17)
KDSA-Encrypted-ECDSA-Sign-P384 (Function Code 18)
KDSA-Encrypted-ECDSA-Sign-P521 (Function Code 19)

The KDSA-ECDSA-Sign function uses a cryptographic key (K) that is a plain text key for the author's private key. This key is to be protected by software. The KDSA-Encrypted-ECDSA-sign function uses an encrypted key to hold the author's private key and has a corresponding Wrapping Key Verification Pattern ($Wk_a VP$) to test the key.

The ECDSA algorithm uses a random number to randomize the signature. The KDSA-ECDSA-Sign function for NIST primes (e.g., P256, P384 and P521) with plain text keys utilize a user specified random number, RN, in the parameter block. Allowing the user to specify the random number makes this instruction deterministic and faster executing. The KDSA-Encrypted-ECDSA-Sign instruction for NIST primes with encrypted key uses the specified random number to generate a secret random number within the execution of the instruction, hidden to the user, which adds security to the signature process and will vary with the same input. In another embodiment, the KDSA-Encrypted-ECDSA-Sign instruction for NIST primes with encrypted key allows the user to specify a random number and further randomizes this number with parts of the Time Of Day (TOD) clock allowing simulation models to be deterministic but actual hardware to be random. The EdDSA technique does not use a random number, in one embodiment.

The result of the sign function is a signature which is represented by two integers, R and S, which are between, for instance, a value of zero and the order of the curve for the particular function and is stored in the designated location in the parameter block.

As an example, condition code 1 is set if the verification pattern mismatches, the hashed message is zero, or the private key is zero or greater than or equal to the order of the curve or not on the curve. Condition code 2 is set if the random number is not invertible for ECDSA-Sign, but not for Encrypted-ECDSA-Sign. For encrypted-ECDSA-Sign, the hidden random number generated is invertible. Condition code 0 is set, if signature generation is successful.

Figure 6:
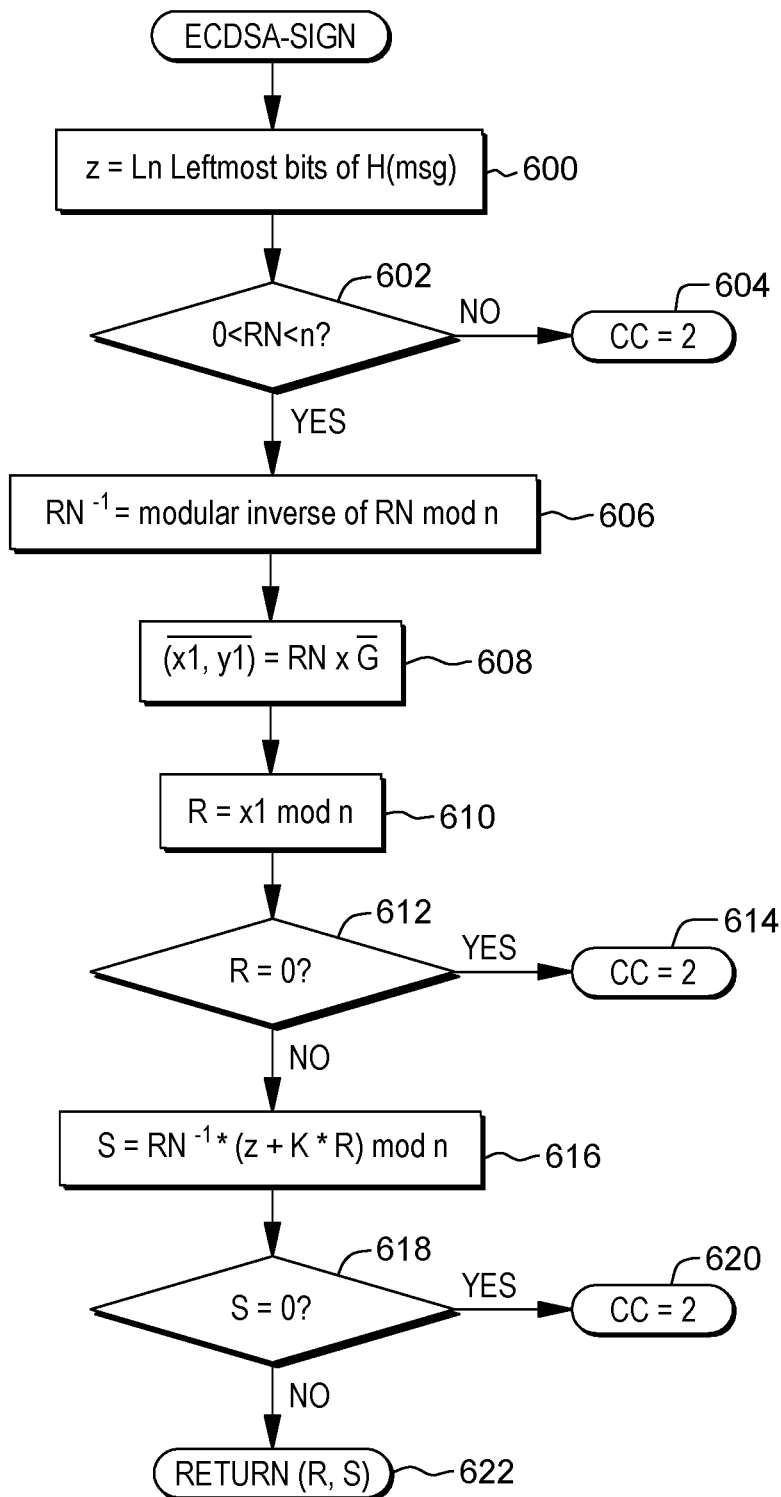
FIG. 6 depicts one example of processing associated with generating a signature using the Elliptic Curve Digital Signature Algorithm, in accordance with an aspect of the present invention.

One example of sign processing using the Elliptic Curve Digital Signature Algorithm is described with reference to FIG. 6. In this processing, an overbar —, indicates a point with x and y coordinates.

In one example, initially, a variable z is set equal to a selected number (Ln) of the leftmost bits of a hashed message (H(msg)), where Ln is the length of n, the order of a base point of a curve for the sign function, STEP 600. Further, a determination is made as to whether a chosen random number (RN) is between a first value (e.g., 0) and a second value (e.g., n), INQUIRY 602. If the random number is not between the two values, then a condition code is set to a selected value (e.g., CC=2), STEP 604. However, if the random number is between the two values, then $RN^{-1}$ is set equal to a modular inverse of RN mod n, STEP 606.

Additionally, coordinates ($\overline{x1}$, $\overline{y1}$) are set equal to the scalar multiplication of RN and where G is a generating point, STEP 608. Further, R is set equal to x1 mod n, where n is the order of G, x is scalar multiplication of a point, and + is modular addition, STEP 610. A determination is made as to whether R is set equal to a chosen value, such as zero, INQUIRY 612. If R is set equal to zero, then the condition code is set to a selected value (e.g., CC=2), STEP 614. However, if R is not set equal to zero, then a variable S is set equal to $RN^{-1}*(z+K*R)$ mod n, STEP 616, where K is the key.

A determination is made as to whether S is equal to a chosen value, such as zero, INQUIRY 618. If S is equal to zero, then the condition code is set to a selected value (e.g., CC=2), STEP 620. Otherwise, the signature is returned, STEP 622. The signature includes two integers, R and S.

As indicated, operands for the sign functions are provided via parameter blocks, examples of which are described below.

One example of a parameter block for the KDSA-ECDSA-Sign P256 function with a plain text key is described with reference to FIG. 4E. In one example, a parameter block 420 includes, for instance, the following fields: a signature (R) 421, a signature (S) 422, a hashed message 423, a private cryptographic key in plain text 424, a random number 425, and a reserved save area 426. Example offsets within the parameter block are depicted in FIG. 4E.

Further, referring to FIG. 4F, a parameter block 427 for the KDSA-ECDSA-Sign P384 function with plain text key includes, for instance, the following fields: a signature (R) 428, a signature (S) 429, a hashed message 430, a private cryptographic key (K) in plain text 431, a random number 432, and a reserved save area 433. Example offsets within the parameter block are depicted in FIG. 4F.

Yet further, referring to FIG. 4G, a parameter block 434 for the KDSA-ECDSA-Sign P521 function with plain text key includes, for instance, the following fields: a signature (R) 435, a signature (S) 436, a hashed message 437, a private cryptographic key in plain text 438, a random number 439, and a reserved save area 440. In one example, the parameters, except the hashed message, are 528 bits (66 bytes) and are right-aligned in the 80 byte fields. Source parameters of 521 bits are, e.g., to be padded with 7 zeros to the left of the most significant bit, as prescribed by the NIST standard. The destination fields for the signature are, e.g., 66 bytes wide right-aligned in the parameter field and the remaining 14 bytes remain unchanged. The hashed message is, e.g., 80 bytes wide. Example offsets within the parameter block are depicted in FIG. 4G.

Continuing with the parameter blocks, referring to FIG. 4H, a parameter block 441 for the KDSA-Encrypted-ECDSA-Sign P256 function, which uses an encrypted key includes, for instance, the following fields: a signature (R) 442, a signature (S) 443, a hashed message 444, an encrypted private cryptographic key ($WK_a(K)$) 445, a random number 446, an AES wrapping key verification pattern ($WK_aVP$) 447, and a reserved save area 448. Example offsets within the parameter block are depicted in FIG. 4H.

Further, referring to FIG. 4I, a parameter block 449 for the KDSA-Encrypted-ECDSA-Sign-P384 function includes, for instance, the following fields: a signature (R) 450, a signature (S) 451, a hashed message 452, an encrypted private cryptographic key ($WK_a(K)$) 453, a random number 454, an AES Wrapping Key Verification Pattern ($WK_aVP$) 455, and a reserved save area 456. Example offsets within the parameter block are depicted in FIG. 4I.

Yet further, referring to FIG. 4J, a parameter block 457 for the KDSA-Encrypted-ECDSA-Sign-P521 function includes, for instance, the following fields: a signature (R) 458, a signature (S) 459, a hashed message 460, an encrypted private cryptographic key ($WK_a(K)$) 461, a random number 462, an AES Wrapping Key Verification Pattern ($WK_aVP$) 463, and a reserved save area 464. In one example, the P521 format has 521 bits with an additional most significant 7 bits of zeros for R, S, and operands for 66 bytes which are right-aligned within the 80 byte field. The remaining 14 bytes of the R and S fields are unchanged. The hashed message is, e.g., an 80 byte field, and H(msg) and operands are right-aligned within the 80 byte field. Example offsets within the parameter block are depicted in FIG. 4J.

KDSA-EdDSA-Verify Functions

In one embodiment, two KDSA-EdDSA-Verify functions for Edwards-curve with special primes are supported, and the corresponding function codes are provided below:

KDSA-EdDSA-Verify-Ed25519 (Function Code 32)
KDSA-EdDSA-Verify-Ed448 (Function Code 36)

The locations of the operands and addresses used by each of these functions are as shown in FIGS. 3D-3F. The parameter block for each function, described below, contains the operands used by the KDSA-EdDSA-Verify functions and is addressed by general register 1.

In one embodiment, EdDSA is defined to have integers encoded in little-endian form as opposed to most cryptographic techniques. The Ed25519 in little-endian octet (byte) form encodes the 32 byte string has h[0], . . . , h[31], where h[31] is the most significant. If A is the address of h[0], then A+31 is the address of h[31], the most significant byte. The most significant bit of the most significant byte is not needed for the 255 bit format. For compressed points, the y-coordinate is placed in the 255 least significant bits and the x-coordinate least significant bit is placed in the remaining most significant bit (h[31], bit 7). Ed448 in little-endian octet form encodes a compressed point with the 56 byte y-coordinate in the least significant 56 bytes of the 57 bytes and the x-coordinate least significant bit is placed in the most significant bit of the most significant byte of the 57 bytes (h[56], bit 7) and the remaining bits of the byte are filled with zeros.

The KDSA-EdDSA-Verify instruction checks the validity of a signed message. The originator of the message has a public key that can be used to see if the signature matches the message (e.g., hashed message). The signature includes two values in the prime field designated by R and S. In one example, R is a compressed point which, in one example, is thought of as an integer (though potentially greater than the prime's value) and S is an integer. The originator and receiver agree on a hashing scheme for creating the signature. The KDSA-EdDSA-Verify instruction operates on a full message which is addressed by operand 2. The originator's public key is represented by K in the parameter block and it is in a compressed format where the least significant bit of the x coordinate is concatenated to all the bits of the y coordinate. Therefore, the public key is slightly wider than the prime of the curve taking 57 bytes for the Ed448 curve. The operation results in a true or false validity indication in the condition code.

As an example, condition code 0 is set if the signature is valid, and condition code 2 is set if the signature is invalid. Further, condition code 1 is set when the public key is invalid due to, e.g., not being greater than zero and less than the prime, and on the curve.

One example of verify processing using the Edwards-curve Digital Signature Algorithm is described with reference to FIG. 7. In one example, Ed25519 uses SHA-512 and Ed448 uses SHAKE256 for hashing, H(x). These curves use B as the base point rather than $\overline{G}$. Further, in this processing, an overbar $\overline{\phantom{-}}$, indicates a point with x and y coordinates, + is modular addition and x is scalar multiplication of a point. K is the compressed public key and takes up, e.g., 32 bytes for Ed25519 and 57 bytes for Ed448.

Figure 7:
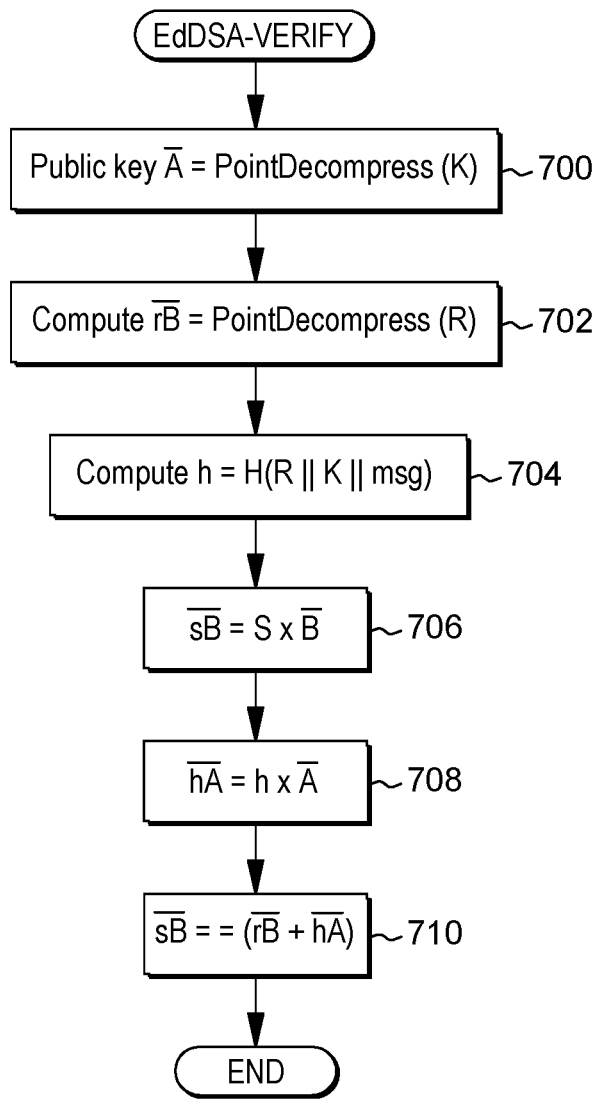
FIG. 7 depicts one example of processing associated with verifying a signature using the Edwards-curve Digital Signature Algorithm, in accordance with an aspect of the present invention.

Referring to FIG. 7, in one example, public key A is set equal to a point decompress (K), where K is a compressed public key point=(x(lsb)∥y), where lsb is least significant bit and concatenation, STEP 700. Further, $\overline{rB}$ is computed, in which $\overline{rB}$=point decompress (R), where R=(x(lsb)∥y), STEP 702. Further, h is computed, in which h=H (R∥K∥msg), STEP 704. Point decompress reverses point compression, which allows a point $\overline{P}=(x_p, y_p)$ to be represented compactly using $y_p$ and a single additional bit $x_p$ thus derived from $x_p$ and $y_p$.

Further, $\overline{sB}$ is set equal to S×$\overline{B}$ (scalar multiply of point), STEP 706, and $\overline{hA}$ is set equal to h×$\overline{A}$ (scalar multiply of point), STEP 708. A boolean test for integer compare equal is performed ($\overline{sB}$==($\overline{rB}$+$\overline{hA}$)) and a true or false indication is returned, e.g., in a condition code, STEP 710.

One example of a parameter block for the KDSA-EdDSA-Verify-Ed25519 function is described with reference to FIG. 4K. In one example, a parameter block 468 includes, for instance, the following fields: a signature (R) 469, a signature (S) 470, a public cryptographic key (K) 471, and a reserved save area 472. Each field is represented, in one example, as 32 bytes or 256 bits wide, and example offsets within the parameter block are depicted in FIG. 4K.

Further, referring to FIG. 4L, a parameter block 473 for the KDSA-EdDSA-Verify-Ed448 function includes, for instance, the following fields: a signature (R) 474, a signature (S) 475, a public cryptographic key (K) 476, and a reserved save area 477. In one example, each field is 64 bytes or 512 bits wide. The S parameter is represented by the rightmost 448 bits of the 512 bit field and the R and K fields which are compressed points are represented by the rightmost 456 bits of the 512 bit field. Example offsets within the parameter block are depicted in FIG. 4L.

KDSA-EdDSA-Sign Functions

In one embodiment, two KDSA-EdDSA-Sign functions and two KDSA-Encrypted-EdDSA-Sign functions are supported, and the corresponding function codes are provided below:

KDSA-EdDSA-Sign-Ed25519 (Function Code 40)
KDSA-EdDSA-Sign-Ed448 (Function Code 44)
KDSA-Encrypted-EdDSA-Sign-Ed25519 (Function Code 48)
KDSA-Encrypted-EdDSA-Sign-Ed448 (Function Code 52)

The KDSA-EdDSA-Sign function uses a cryptographic key (K) that is a plain text key for the author's private key. This key is to be protected by software. The KDSA-Encrypted-EdDSA-Sign function uses an encrypted key to hold the author's private key and has a corresponding Wrapping Key Verification Pattern ($WK_aVP$) to test the key.

The EdDSA technique, in one embodiment, does not use a random number, and therefore, none is specified for KDSA-EdDSA-Sign functions.

The result of the KDSA-EdDSA-Sign function is a signature which is represented by a compressed point, R, and an integer, S, which is between, for instance, a value of zero and the order of the curve for the particular function and is stored in the designated location in the parameter block.

In one example, condition code 0 is set if signature generation is successful. Further, condition code 1 is set if the verification pattern mis-matches, the message is zero, or the private key is, e.g., zero or greater than or equal to the order of the curve or not on the curve.

One example of sign processing using the Edwards-curve Digital Signature Algorithm is described with reference to FIG. 8. In this processing, an overbar ⁻, indicates a point with x and y coordinates, * indicates modular multiplication, x is scalar multiplication of a point; + is modular addition, and ∥ is concatenation. As examples, the Ed25519 uses SHA-512 and Ed448 uses SHAKE256 for hashing, H(x).

Figure 8:
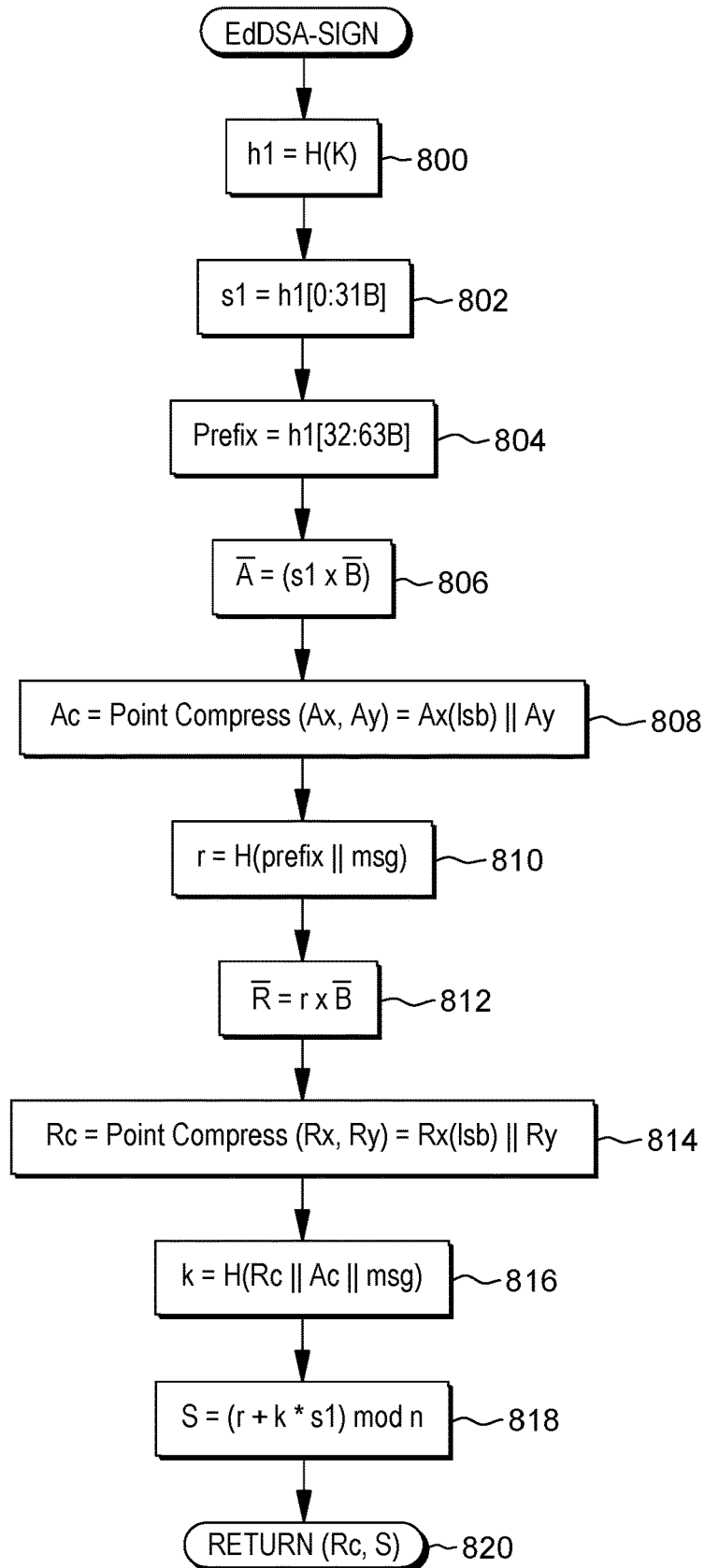
FIG. 8 depicts one example of processing associated with generating a signature using the Edwards-curve Digital Signature Algorithm, in accordance with an aspect of the present invention.

Referring to FIG. 8, in one embodiment, h1 is set equal to H(K), which is the hash of the private key, STEP 800. s1 is set equal to h1 (0:31B), which is bytes 0 to 31, STEP 802, and prefix is set equal to h1(32:63B), STEP 804. $\overline{A}$ is set equal to (s1×$\overline{B}$), which is the public key, STEP 806. Ac is set equal to a point compress (Ax, Ay), which is equal to Ax(lsb)∥Ay, STEP 808. Further, r is set equal to H (prefix∥msg), STEP 810. $\overline{R}$ is set equal to r×$\overline{B}$ (equal to R in RFC8032), STEP 812. Rc is set equal to a point compress (Rx, Ry)=Rx(lsb)∥Ry, STEP 814. k is set equal to H(Rc∥Ac∥msg), STEP 818, and S is set equal to (r+k*s1) mod n, STEP 818. Rc and S are returned, STEP 820.

Figure 4M:
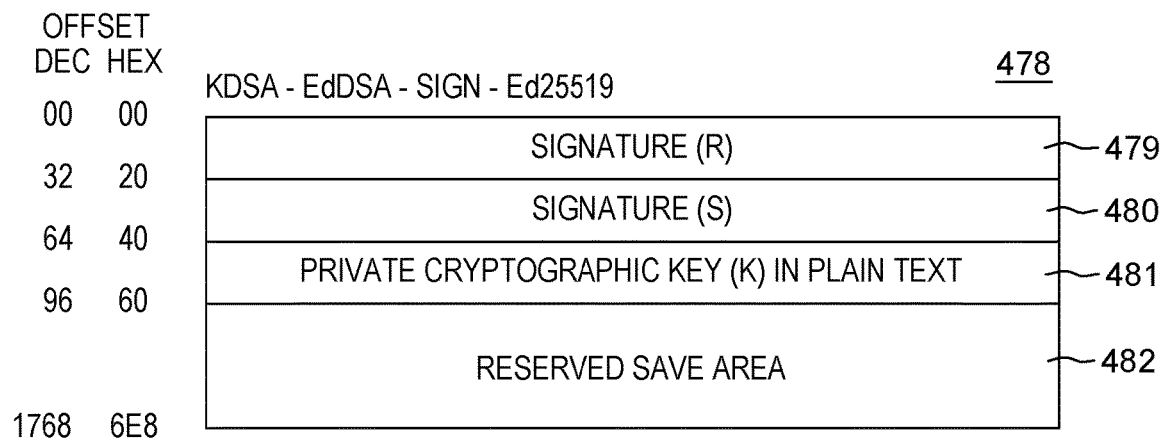

One example of a parameter block for the KDSA-EdDSA-Sign-Ed25519 function is described with reference to FIG. 4M. In one example, a parameter block 478 includes, for instance, the following fields: a signature (R) 479, a signature (S) 480, a private cryptographic key (K) in plain text 481, and a reserved save area 482. The R, S and K parameters are 32 byte fields. The S parameter has, in one example, the most significant bit of the field forced to zero. No random number is specified since the EdDSA algorithm does not require one. Example offsets within the parameter block are depicted in FIG. 4M.

Figure 4N:
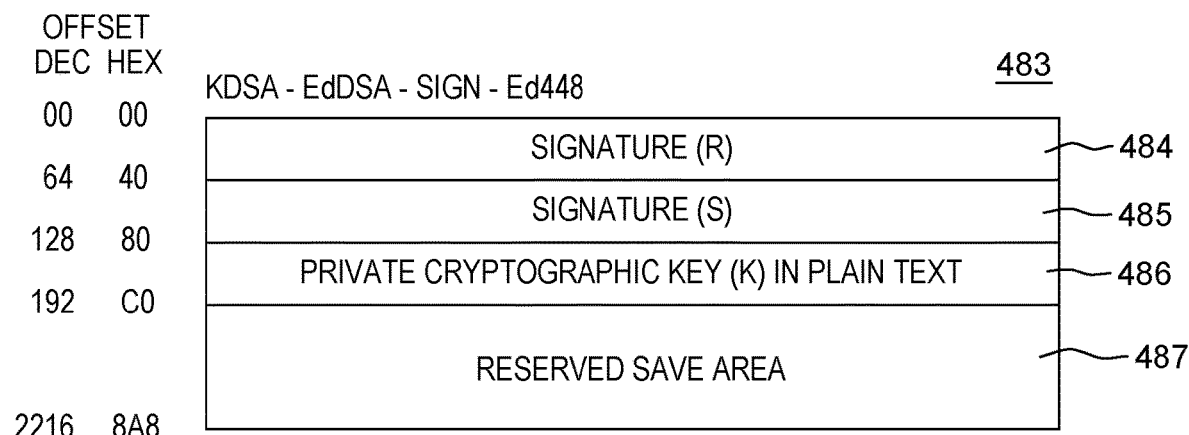

Referring to FIG. 4N, a parameter block 483 for the KDSA-EdDSA-Sign-Ed448 function includes, for instance, the following fields: a signature (R) 484, a signature (S) 485, a private cryptographic key (K) in plain text 486, and a reserved save area 487. In one example, the S parameter is 448 bits or 56 bytes and is right-aligned with the 64 byte field. The R and K parameters are 456 bits or 57 bytes and are right-aligned. The Ed448 format also uses the EdDSA technique which does not utilize a random number. Example offsets within the parameter block are depicted in FIG. 4N.

Further, referring to FIG. 4O, a parameter block 488 for the KDSA-Encrypted-EdDSA-Sign-Ed25519 function includes, for instance, a signature (R) 489, a signature (S) 490, an encrypted private cryptographic key ($WK_a(K)$) 491, an AES wrapping key verification pattern ($WK_aVP$) 492, and a reserved save area 493. In one example, the Ed25519 format utilizes the 255 rightmost bits for S (with a zero for the most significant bit) and the encrypted key, R, and wrapping-key verification pattern use 256 bits. Example offsets within the parameter block are depicted in FIG. 4O.

Referring to FIG. 4P, a parameter block 494 of the KDSA-Encrypted-EdDSA-Sign-Ed448 function includes, for instance, a signature (R) 495, a signature (S) 496, an encrypted private cryptographic key ($WK_a(K)$) 497, an AES Wrapping Key Verification Pattern ($WK_aVP$) 498, and a reserved save area 499. In one example, the S parameter is 448 bits or 56 bytes and the R parameter is 57 bytes and are right-aligned within the 64 byte fields. Example offsets within the parameter block are depicted in FIG. 4P.

Further details of the fields of the parameter blocks for the KDSA-Verify and KDSA-Sign functions are described below. In one example:

Signature (R): The first integer of the signature. In one example, R is greater than zero and less than the order of the curve. For EdDSA functions, R is slightly wider than the prime since it represents a compressed point where the least significant bit of X is concatenated with Y.

Signature (S): The second integer of the signature. In one example, S is greater than zero and less than the order of the curve.

Hashed Message—H(msg): The sign and verify operations utilize a hashed version of the author's message for ECDSA curves. This is performed prior to the KDSA instruction to allow greater flexibility in supported encryption. The hashed message is, for instance, an integer greater than or equal to zero and less than the prime of the curve. This parameter is not available on EdDSA curves, since they do not pre-hash the message, and instead operand 2 addresses the encrypted message.

Cryptographic Key (K): The cryptographic key used in the sign and verify operations begins at various bytes of the parameter block. The size of the key field and its offset in the parameter block are dependent on the function code, as shown in FIG. 9. The * in FIG. 9 indicates that zeros are added to the key length to provide the length in bytes.

In one example, Ed25519 uses the 255 rightmost bits of the 256 bit, 32 byte field. The KDSA-Sign for P521 and Ed448 use different key format widths for encrypted key and plain text key. The encrypted key is encoded and uses a 128 bit boundary. The P521 plain text key for sign and for verify are 521 bits which is 65 bytes and 1 bit, which is aligned in the right-most bits of the 66 byte field.

Reserved Save Area: The reserved save area is a predefined amount of memory to be used to save state information to be used, e.g., if the instruction ends in partial completion, allowing the instruction to be restarted at the point of partial completion.

AES Wrapping-Key Verification Pattern (WK$_a$VP): For the KDSA-Encrypted-Sign functions (e.g., function codes 17-19, 48 and 52), the 32 bytes immediately following the key in the parameter block contain the AES wrapping-key verification pattern (WK$_a$VP).

For the KDSA-Verify functions and the plain text key KDSA-Sign functions, the WK$_a$VP field is not present in the parameter block.

Wrapping-Key Verification: For the KDSA-Sign with encrypted key functions (e.g., function codes 17-19, 48 and 52), the contents of the 32-byte WK$_a$VP field are compared with the contents of an AES wrapping-key verification pattern register (e.g., a register including a 256 bit AES wrapping key verification pattern). If they mismatch, the parameter block location remains unchanged, and the operation is completed by setting condition code 1. If they match, the contents of the key field of the parameter block are deciphered using the AES wrapping key to obtain the cryptographic key, K, which is used in the sign processing described herein. In one example, encrypted ECC keys are protected by AES-256 encryption.

For the KDSA functions that do not use encrypted keys, wrapping key verification is not performed.

Random Number (RN): The KDSA-ECDSA-Sign functions using NIST primes (e.g., P256, P384, and P521) have an input random number. The random number is to be, for instance, greater than zero. More significant bits are, e.g., forced to zero and if not less than the order of the curve of the function, the order of the curve is subtracted from the random number. In one example, the random number is to be invertible by the order of curve; otherwise, the parameter block location remains unchanged, and the operation is completed by setting condition code 2.

In one example, for KDSA-Encrypted-ECDSA-Sign functions, the random number is greater than zero or the parameter block location remains unchanged, and the operation is completed by setting condition code 2. For KDSA-Encrypted-ECDSA-Sign functions, the random number does not have to be invertible since it is not used directly, but instead, is used as a seed to create an invertible, hidden random number.

A PER storage-alteration event is recognized when applicable for the portion of the parameter block (including the reserved field of the parameter block) that is stored. A PER zero-address-detection event is recognized when applicable for the second operand location and for the parameter block. When PER events are detected for one or more of these locations, it is unpredictable which location is identified in the PER access identification (PAID) and PER ASCE ID (AI).

For functions that perform a comparison of the encrypted cryptographic key with the wrapping-key verification pattern register, it is unpredictable whether access exceptions and PER zero-address detection events are recognized for the second operand when the comparison results in a mismatch and the respective operand's length is non-zero.

Access exceptions may be reported for a larger portion of an operand than is processed in a single execution of the instruction; however, access exceptions are not recognized, in one embodiment, for locations beyond the length of an operand nor for locations more than 4K bytes beyond the current location being processed.

Example conditions for KDSA include, for instance:

A specification exception is recognized, and no other action is taken if any of the following occurs:

1. Bits 57-63 of general register 0 specify an unassigned or uninstalled function code.
2. The R$_2$ field designates an odd-numbered register or general register 0.

Resulting Condition Code examples:

0 Verify: Signature verified for function; Sign: Normal completion.

1 Verify: Public Key not on Curve; Sign: Key verification pattern mismatch.

2 Verify: Signature is incorrect; Sign: Random Number not invertible (0<RN<order of curve).

3 Partial completion

Example Program Exceptions:

Access (fetch, parameter block fields, operand 2 (EdDSA functions only); store, parameter block fields)

Operation (if the message security assist extension 9 is not installed)

Specification

Transaction constraint

Example priority of execution for KDSA includes, for instance:

1.-6. Exceptions with the same priority as the priority of program-interruption conditions for the general case.

7.A Access exceptions for second instruction halfword.

7.B Operation exception.

7.0 Transaction constraint.

8. Specification exception due to invalid function code or invalid register number.

9. Specification exception due to invalid operand length.

10.A.1 Access exceptions for an access to the parameter block.

10.A.2. Condition code 1 or 2 due to verification-pattern mismatch or non-invertible random number or public key not on curve.

10.B Access exceptions for an access to the second operand.

11. Condition code 3 due to partial processing.

12. Condition code 0 due to normal completion or condition code 2 due to signature incorrect.

Programming Notes:

1. In one embodiment, if the program is to frequently test for the availability of a function, it should perform the query function once during initialization; subsequently, it should examine the stored results of the query function in memory with an instruction such as, e.g., Test Under Mask.

2. As observed by this CPU, other CPUs, and the I/O subsystem, inconsistent results may be briefly stored in the first operand location.

3. When condition code 3 is set, the general registers containing the operand addresses and lengths, and the parameter block, are usually updated such that the program can simply branch back to the instruction to continue the operation.

As described herein, in one aspect, a single instruction (e.g., a single architected machine instruction at the hardware/software interface, e.g., Compute Digital Signature Authentication instruction) is provided to perform signature generation and/or verify functions using, e.g., a general-purpose processor. This instruction is, for instance, a hardware instruction defined in an Instruction Set Architecture (ISA). As a result, the complexity of the program related to sign and/or verify functions is reduced. Further, performance of the functions, and thus, the processor, is improved. Compared to a software implementation, executing the single instruction requires significantly fewer execution cycles to perform the same operation. Additionally, by using a single architected instruction, interim results are encrypted, in one embodiment, providing additional security if the instruction is partially completed.

As examples, the Compute Digital Signature Authentication instruction is used in creating a signature used in signing a message and in verifying the message and/or the sender of the message, when the message is received. For instance, a user (either a sender or someone on behalf of the sender) executes the Compute Digital Signature Authentication instruction to obtain a signature R, S. The sender sends a message along with the signature R, S to a receiver. The receiver receives the message and the signature and performs verification using, e.g., the Compute Digital Signature Authentication instruction. If the signature and/or sender is verified (e.g., a result of the instruction indicates true), then the message is read; otherwise it is rejected.

Although various fields and registers of the Compute Digital Signature Authentication instruction are described, one or more aspects of the present invention may use other, additional or fewer fields or registers, or other sizes of fields and registers, etc. Many variations are possible. For instance, implied registers may be used instead of explicitly specified registers or fields of the instruction and/or explicitly specified registers or fields may be used instead of implied registers or fields. Other variations are also possible.

One or more aspects of the present invention are inextricably tied to computer technology and facilitate processing within a computer, improving performance thereof. The use of a single architected machine instruction to perform signature generation and/or verifying improves performance within the computing environment. The signed/verified messages may be used in many technical fields, such as in computer processing, medical processing, security, etc. By providing optimizations in signing/verifying, these technical fields are improved by reducing execution time.

Further details of one embodiment of facilitating processing within a computing environment, as it relates to one or more aspects of the present invention, are described with reference to FIGS. 10A-10B.

Referring to FIG. 10A, in one embodiment, an instruction to verify a signed message is obtained (1000). The instruction is a single architected instruction (1002). The instruction is executed (1004), and the executing includes, for instance, determining a verify function of a plurality of verify functions supported by the instruction to be performed (1006). Input for the instruction, which includes, for instance, a message and a key, is obtained (1008). A signature of the message is verified, based on the verify function to be performed and the input (1010).

As an example, the message is pre-hashed to a fixed length (1011). For instance, the message is pre-hashed for a subset of functions of the plurality of verify functions (e.g., for ECDSA NIST curves) and not for another subset of functions of the plurality of verify functions (e.g., Edwards curves) (1012).

In one example, the key includes an elliptic curve public key (1013). The elliptic curve public key includes, for instance, a point on a curve and a plurality of coordinates with a prime field (1014).

Further, as an example, the signature is represented by a plurality of values (1016). For instance, the plurality of values includes a first integer and a second integer between zero and an order of a curve for the verify function to be performed (1018). In one particular example, the signature is signed using an Edwards-curve digital signature algorithm sign function, and the plurality of values includes a compressed point and an integer (1019).

In one embodiment, referring to FIG. 10B, the verifying produces a validity indication in a condition code for the instruction (1020). Additionally, as one example, the plurality of verify functions includes a plurality of elliptic curve digital signature algorithm verify functions for a plurality of primes (1022). The plurality of primes includes, for instance, National Institute of Standards and Technology (NIST) prime P256, NIST prime P384 and NIST prime P521 (1024). As a further example, the plurality of verify functions includes a plurality of Edwards-curve digital signature algorithm verify functions for a plurality of primes (1026). The plurality of primes includes, for instance, Edwards-curve prime Ed25519 and Edwards-curve prime Ed448 (1028).

Other variations and embodiments are possible.

Figure 11A:
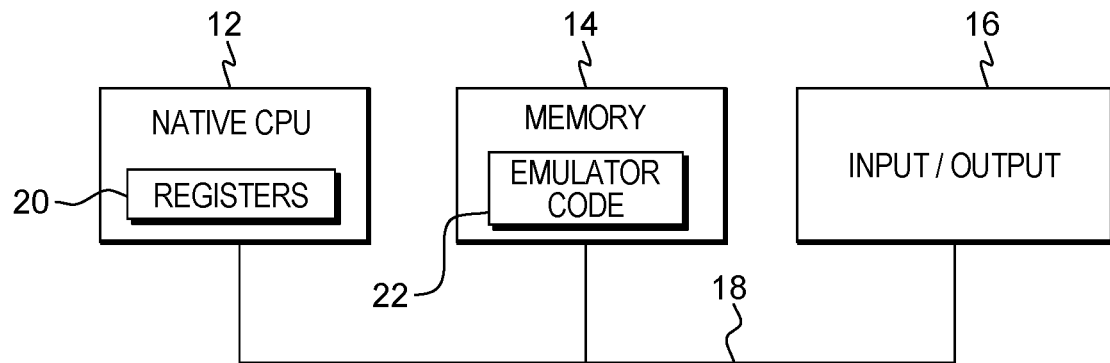
FIG. 11A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 11A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 11B:
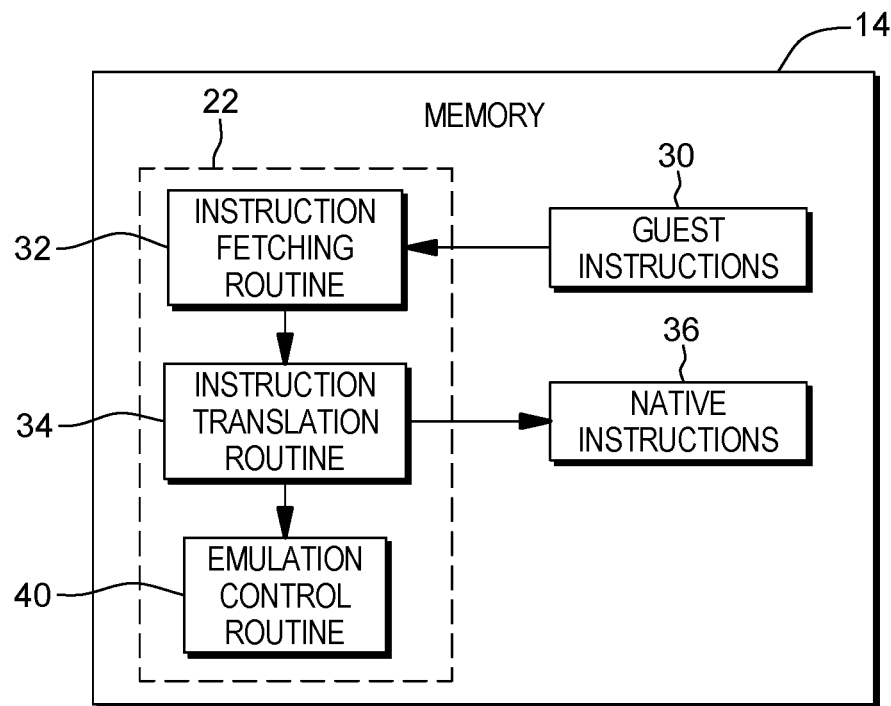
FIG. 11B depicts further details of the memory of FIG. 11A.

Further details relating to emulator code 22 are described with reference to FIG. 11B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to provide signing/verifying, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
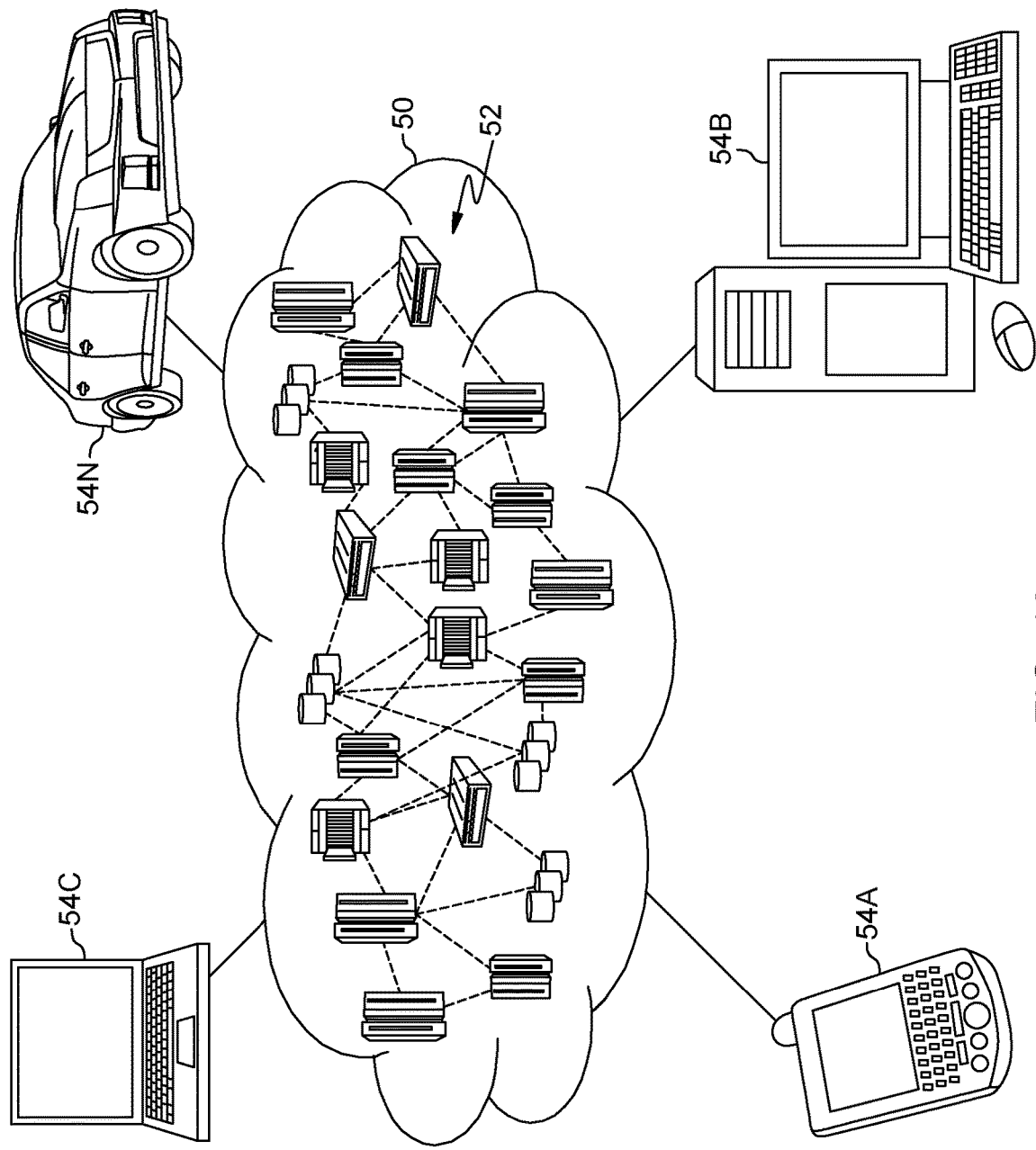
FIG. 12 depicts one embodiment of a cloud computing environment.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
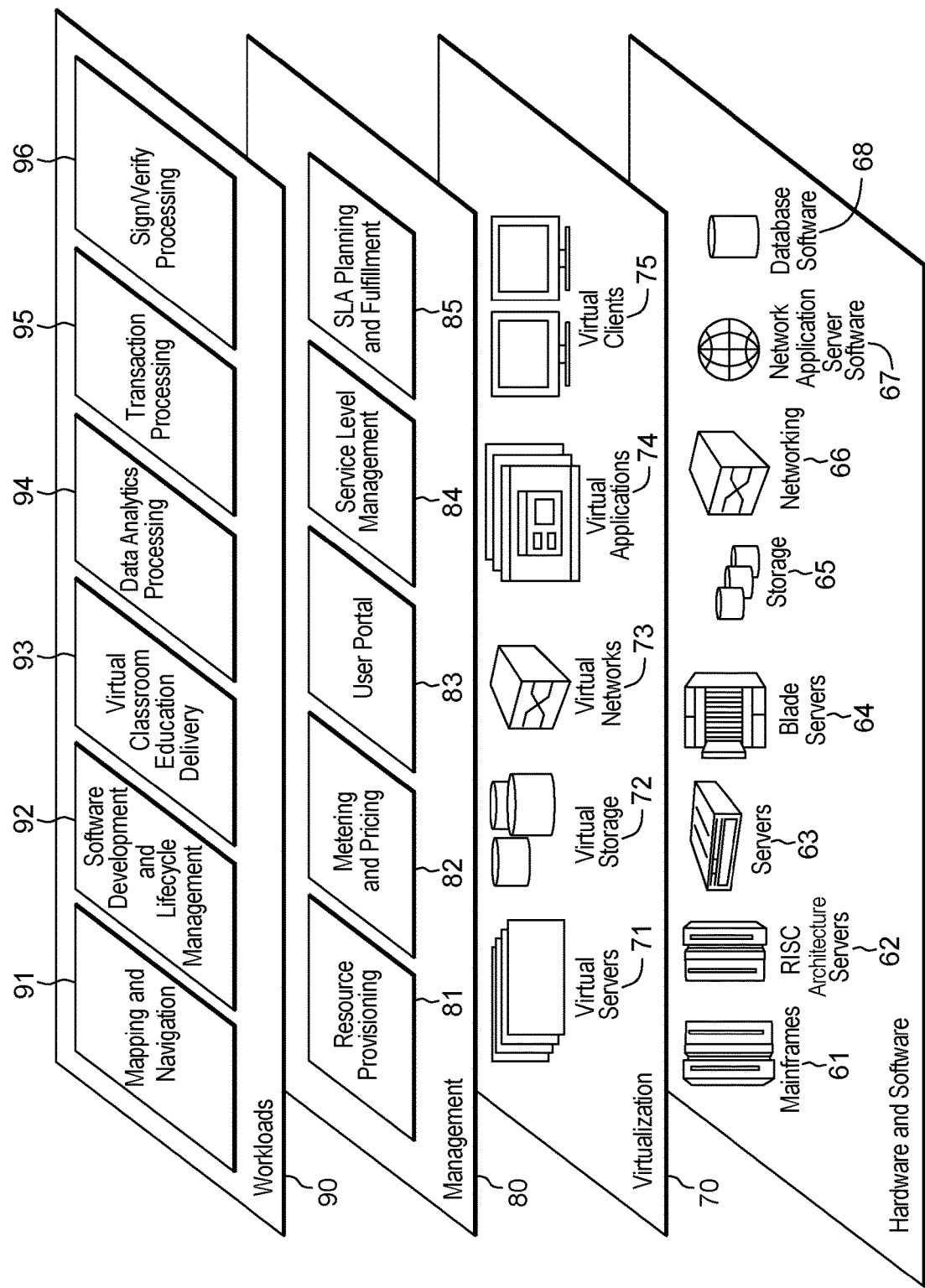
FIG. 13 depicts one example of abstraction model layers.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sign/verify processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of cryptography algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a computer readable storage medium readable by a processing circuit and storing instructions for performing a method comprising:
      obtaining an instruction to verify a signed message, the instruction being a single architected instruction; and
      executing the instruction, the executing comprising:
         determining a verify function of a plurality of verify functions supported by the instruction to be performed, the determining including identifying the verify function via a corresponding verify function code of a plurality of verify function codes supported by the instruction;
         obtaining input for the instruction, the input comprising a message and a key; and
         verifying a signature of the message based on the verify function to be performed and the input.

2. The computer program product of claim 1, wherein the message is pre-hashed to a fixed length.

3. The computer program product of claim 2, wherein the message is pre-hashed for a subset of verify functions of the plurality of verify functions supported by the instruction, and not for another subset of verify functions of the plurality of verify functions.

4. The computer program product of claim 1, wherein the key comprises an elliptic curve public key.

5. The computer program product of claim 4, wherein the elliptic curve public key comprises a point on a curve and a plurality of coordinates with a prime field.

6. The computer program product of claim 1, wherein the signature is represented by a plurality of values.

7. The computer program product of claim 6, wherein the plurality of values comprises a first integer and a second integer between zero and an order of a curve for the verify function to be performed.

8. The computer program product of claim 6, wherein the signature is signed using an Edwards-curve digital signature algorithm sign function, and the plurality of values includes a compressed point and an integer.

9. The computer program product of claim 1, wherein the verifying produces a validity indication in a condition code for the instruction.

10. The computer program product of claim 1, wherein the plurality of verify functions comprises a plurality of elliptic curve digital signature algorithm verify functions for a plurality of primes.

11. The computer program product of claim 10, wherein the plurality of primes includes National Institute of Standards and Technology (NIST) prime P256, NIST prime P384 and NIST prime P521.

12. The computer program product of claim 1, wherein the plurality of verify functions comprises a plurality of Edwards-curve digital signature algorithm verify functions for a plurality of primes.

13. The computer program product of claim 12, wherein the plurality of primes includes Edwards-curve prime Ed25519 and Edwards-curve prime Ed448.

14. A computer system for facilitating processing within a computing environment, the computer system comprising:
   a memory; and
   a processor coupled to the memory, wherein the computer system is configured to perform a method comprising:
      obtaining an instruction to verify a signed message, the instruction being a single architected instruction; and
      executing the instruction, the executing comprising:
         determining a verify function of a plurality of verify functions supported by the instruction to be performed, the determining including identifying the verify function via a corresponding verify function code of a plurality of verify function codes supported by the instruction;
         obtaining input for the instruction, the input comprising a message and a key; and
         verifying a signature of the message based on the verify function to be performed and the input.

15. The computer system of claim 14, wherein the verifying produces a validity indication in a condition code for the instruction.

16. The computer system of claim 14, wherein the plurality of verify functions comprises a plurality of elliptic curve digital signature algorithm verify functions for a plurality of primes.

17. The computer system of claim 14, wherein the plurality of verify functions comprises a plurality of Edwards-curve digital signature algorithm verify functions for a plurality of primes.

18. A computer-implemented method of facilitating processing within a computing environment, the computer-implemented method comprising:
   obtaining, by a processor, an instruction to verify a signed message, the instruction being a single architected instruction; and
   executing the instruction, the executing comprising:
      determining a verify function of a plurality of verify functions supported by the instruction to be performed, the determining including identifying the verify function via a corresponding verify function code of a plurality of verify function codes supported by the instruction;
      obtaining input for the instruction, the input comprising a message and a key; and
      verifying a signature of the message based on the verify function to be performed and the input.

19. The computer-implemented method of claim 18, wherein the key comprises an elliptic curve public key.

20. The computer-implemented method of claim 18, wherein the verifying produces a validity indication in a condition code for the instruction.

* * * * *